(12) United States Patent
Michels et al.

(10) Patent No.: US 9,027,039 B2
(45) Date of Patent: May 5, 2015

(54) METHODS FOR ANALYZING, LIMITING, AND ENHANCING ACCESS TO AN INTERNET API, WEB SERVICE, AND DATA

(75) Inventors: Oren Michels, Lafayette, CA (US); Clay Loveless, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 1555 days.

(21) Appl. No.: 12/011,956

(22) Filed: Jan. 29, 2008

(65) Prior Publication Data

US 2008/0209451 A1 Aug. 28, 2008

Related U.S. Application Data

(60) Provisional application No. 60/898,365, filed on Jan. 29, 2007.

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *G06F 15/16* | (2006.01) | |

(52) U.S. Cl.
CPC ...................................... *G06F 15/16* (2013.01)

(58) Field of Classification Search
None
See application file for complete search history.

(56) References Cited

U.S. PATENT DOCUMENTS

| | | | |
|---|---|---|---|
| 6,741,992 B1 | 5/2004 | McFadden | |
| 6,785,721 B1 | 8/2004 | Immerman et al. | |
| 7,017,162 B2 | 3/2006 | Smith et al. | |
| 7,139,999 B2 | 11/2006 | Bowman-Amuah | |
| 2003/0005181 A1 | 1/2003 | Bau, III et al. | |
| 2003/0023957 A1 | 1/2003 | Bau et al. | |
| 2003/0033446 A1 | 2/2003 | Noden | |
| 2005/0138648 A1* | 6/2005 | Ahmed et al. | 719/328 |
| 2005/0289072 A1 | 12/2005 | Sabharwal | |
| 2006/0020585 A1 | 1/2006 | Harvey et al. | |
| 2006/0059253 A1 | 3/2006 | Goodman et al. | |
| 2007/0106649 A1* | 5/2007 | Moore | 707/3 |
| 2008/0155508 A1* | 6/2008 | Sarkar et al. | 717/126 |

OTHER PUBLICATIONS

International Search Report and Written Report dated Jun. 25, 2008 in International Application No. PCT/US08/01150.

* cited by examiner

*Primary Examiner* — Craig Dorais
(74) *Attorney, Agent, or Firm* — Barnes & Thornburg LLP

(57) ABSTRACT

The invention includes an API gateway server that monitors and controls the distribution of API elements from API sources to application developers based on a distribution rule set.

24 Claims, 21 Drawing Sheets

1400

FOGBUGZ 181: SETUP UPSTREAM ⊗ | COMPETE ⊗ | COMPETE

COMPETE API SETTINGS & CONFIGURATION

COMPETE API

| OVERVIEW | GLOBAL RULES | ENDPOINTS | CROSS-DOMAIN POLICY |

ADD NEW ENDPOINT

GET

| GENERAL | PROPERTIES | METHODS | FILTERS | ERRORS | TESTS | OVERRIDES |

ENABLE GENERAL RULE OVERRIDES FOR THIS ENDPOINT:
◉ YES ○ NO

APPLY REQUEST RATE LIMITS:
◉ YES ○ NO

RATE LIMITING TIME PERIOD:
[DAY ▼]

RATE LIMIT PER TIME PERIOD:
5000

ENFORCE PER KEY CALL-PER-SECOND LIMITS:
◉ YES ○ NO

PER-KEY CALL-PER-SECOND LIMIT:
2

CROSS-DOMAIN POLICY FOR API ACCESS VIA FLASH:

[SAVE]

METHODS FOR ANALYZING, LIMITING, AND ENHANCING ACCESS TO AN INTERNET API, WEB SERVICE, AND DATA

REFERENCE TO RELATED APPLICATIONS

This application claims the benefit of and priority to U.S. Provisional Application No. 60/898,365, filed on Jan. 29, 2007, the entire contents of which are incorporated herein by reference.

BACKGROUND

An Application Program Interface (API) typically includes a library of program elements such as functions, routines, protocols, or processes associated with a particular operating system or computing platform. The program elements may be software-based functions and/or processes in the form of source code, scripts, and/or executable code. The computing platform may include software and/or hardware. For example, the hardware may include a type of processor (e.g., Intel® x86 processors) or hardware system. The software may include a version of an operating system such as UNIX, LINUX, WINDOWS, one or more proprietary operating systems, or like environments that allow for running or executing an application and/or program.

An API allows an application programmer to efficiently develop an application program capable of interfacing with the computing platform because the interface work is already done by the API. The programmer simply incorporates or programs the needed API functions from the API library into the application program. A programmer may use a software development kit (SDK) or other tool to develop application programs. The development tool may include APIs or may enable the developer to remotely access APIs for a particular computer platform. Currently, most APIs are either openly accessible or include access control capabilities as part of the API.

Recently, Internet or web-based services have emerged that typically combine two or more web-based services to enhance user experiences at a particular website. These combined web-based services are referred to as "mashups." One approach to combining web-based services has been for at least one service to provide a web-based API to developers such that the web-based service can be integrated with another web-based service. For example, the Internet website ChicagoCrime.org combines the Google Maps web-service with crime information in the Chicago, Ill., USA area to show users where certain crimes have occurred geographically. To integrate the Google Maps service, a user's web browser typically supports Javascript that further enables the user's browser to support the Google Maps API. Google, Inc., of Mountain View, Calif., USA, freely distributes the Google Maps API to developers under certain conditions.

APIs are also used in other ways than "mashups." APIs are used in web applications, internal applications, or intranet applications. APIs are used with desktop applications that access the API over the Internet. APIs are used in web page or desktop "widgets."

One problem with current approaches to distributing APIs, including web-based APIs, is that there are no adequate mechanisms that enable the API provider to control, regulate, and/or monitor API distribution or application development based on their APIs.

SUMMARY

The invention, in various embodiments, is directed to systems, methods, and/or devices that allow for a proxy (application or server) to operate as an intermediary between the program calling the API and the API itself which enables monitoring and control of access to the API. By monitoring and controlling developer access to the API, usage of the API can be more fairly distributed among developers, developer profiles of usage may be tracked and/or analyzed, and/or usage-based billing models may be employed.

In one aspect, the invention includes an application program interface (API) gateway server. The API gateway server includes an API source interface capable of sending a request for one or more API elements to an API source and receiving the one or more API elements from the API source. The API gateway server includes a processor that controls the distribution of the one or more API elements based on a distribution rule set. The API gateway server also includes a developer interface capable of receiving a request for the one or more API elements from a developer client and sending the one or more API elements to the developer client based on the processor's control.

In one configuration, the distribution rule set includes rules associated a limit on the number of API calls over a select period of time, a limit of API calls for the developer client, a limit of API calls for a select IP address, whether a received identity of the developer client matches a stored identity of the developer client, whether a received API developer key matches a stored API developer key, whether a received developer client password matches a stored developer client password, and whether a cryptographic authentication process has been satisfied by the developer client to validate the developer client's identity.

In another configuration, the processor monitors the distribution of the API elements. The processor may monitor at least one of the number of API requests made by the developer client over a period of time, the identity of the developer client, usage trends by the developer client, and usage trends based on IP address. The gateway server may include a monitor interface that sends API distribution information to a user interface where the user interface is remote from the gateway server. The user interface may include a web browser.

In one configuration, the API source interface and the developer interface are included in the same network interface unit. In alternate configuration, the API source interface and the developer interface are included in different network interface units.

In one feature, the controlling process includes determining whether the developer client is authorized to access the one or more API elements and, if authorized, allowing the developer interface unit to send the one or more API elements to the developer client or, if not authorized, preventing the developer interface unit from sending the one or more API elements to the developer client. The determining process may include validating an API developer key associated with the request from the developer client.

In another configuration, the developer client includes a network-based application operating at run-time and the one or more API elements are run-time API elements. The request for the one or more API elements from the developer client may be substantially the same as the request for the one or more API elements to the API source. In other words, the gateway server may relay the request from a developer client to the API source if access is allowed by the processor.

In another aspect, the invention includes an intermediate server for controlling the exchange of data in a data network. The intermediate server includes a transceiver and a processor in communication with the transceiver. A computer readable medium (e.g., software) is configured that enables the processor to i) receive a request for the one or more API elements from a developer client, ii) send a request to an API source for one or more API elements, iii) receive the one or more API elements from the API source, iv) control the distribution of the one or more API elements based on a distribution rule set, and v) send the one or more API elements to the developer client based on the distribution rule set.

In various aspects, the invention enables an easy, web-based dashboard for setting up the a proxy sever configuration and for managing users, business rules and access rules, and for providing usage reports.

BRIEF DESCRIPTION OF THE DRAWINGS

The foregoing and other objects, features, advantages, and illustrative embodiments of the invention will now be described with reference to the following drawings in which like reference designations refer to the same parts throughout the different views. These drawings are not necessarily to scale, emphasis instead being placed upon illustrating principles of the invention.

FIG. 14 shows a web page 1400 displaying endpoint configuration override settings/inputs according to an illustrative embodiment of the invention.

FIG. 18 shows a web page 1800 displaying various endpoint configuration settings/inputs according to an illustrative embodiment of the invention.

FIG. 20 shows a web page 2000 displaying various global rules according to an illustrative embodiment of the invention.

DESCRIPTION

Figure 1:
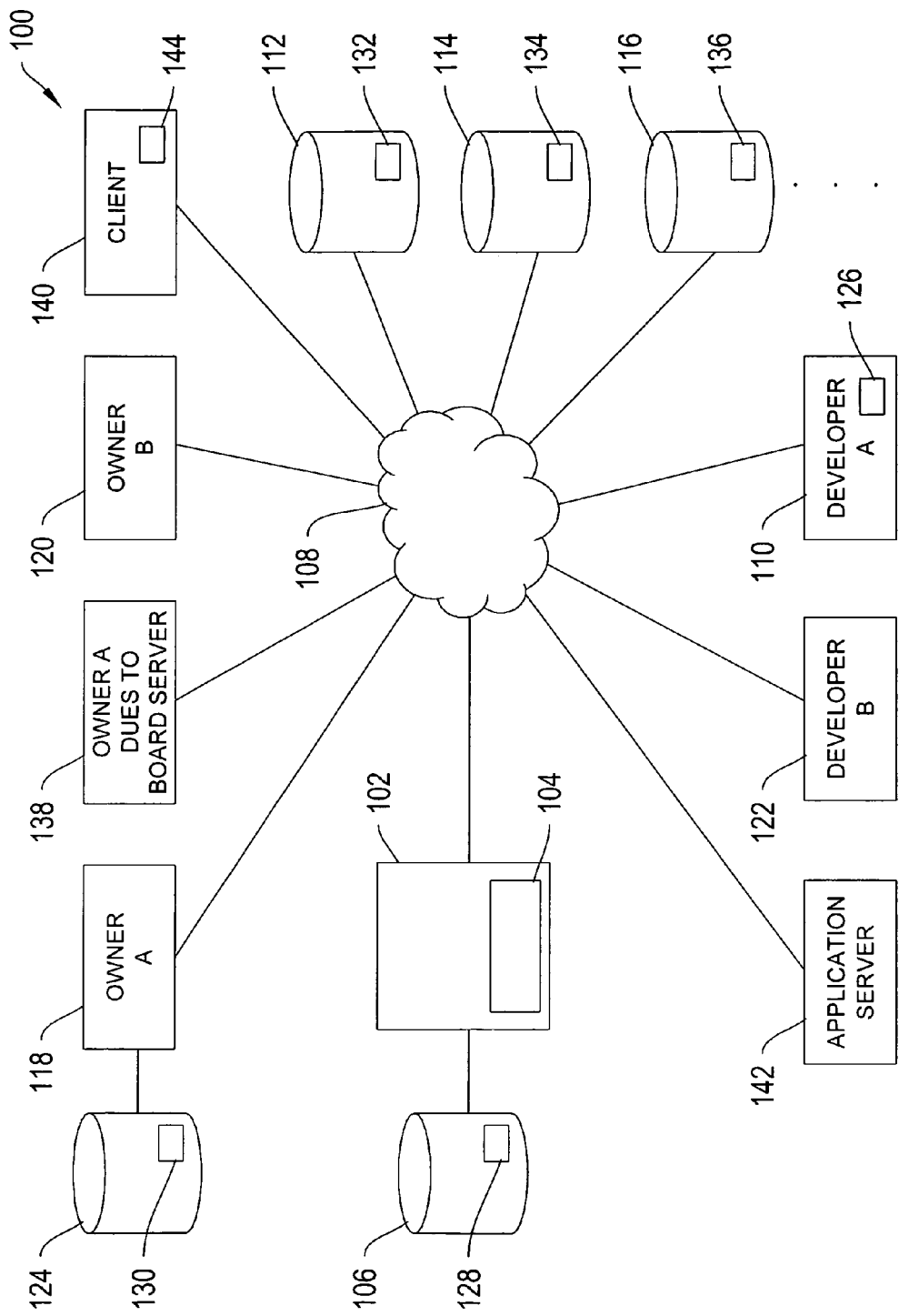
FIG. 1 is a block diagram of an API access system including a proxy that monitors and controls access to one or more APIs according to an illustrative embodiment of the invention.

FIG. 1 is a block diagram of an API access system 100 including a proxy application 104 that monitors and controls access to one or more APIs according to an illustrative embodiment of the invention. The system 100 includes a server 102, local API database 106, network 108, remote developer systems 110 and 122, owner systems 118 and 120, and remote API databases 112, 114, and 116. The server 102 also includes a proxy application 104 and APIs 128, 130, 132, 134, and 136. The developer system 110 includes client development application 126. The system may also include monitor server 138, a user device 140, and application server 142. The user device 140 may include a web browser 144.

In certain embodiments, the server 102 includes a web server and operates as proxy server 104. A proxy server 104 may be simply referred to as a proxy. The proxy server 104 may receive requests for access from client developer application programs, such as application 126, hosted on computer systems 110 or 122 via a network 108. The proxy server 104 may evaluate these requests and determine which of the communications requests to allow or reject. If a communications request is approved, the proxy server 104 may communicates with a remote server, e.g., server 118, or database 106, 112, 114, or 116 to retrieve the requested API 130 information on behalf of the client application 126 of the system 112 or 110. In one embodiment, the proxy server 104 does so by relaying requests from the client application 126, e.g., an SDK application of system 110, to the remote server 118 (which stores API information or data in database 124) and returning responses from the remote server 118 back to the client application 126 of the system 110. In this manner, the proxy server 104 provides the illusion that the client program 126 is communicating directly with the remote server 118 and also acts as a gateway for access to the API 130. During this and any subsequent communications between the system 110 and remote server 118, the proxy server 104 may gather information related the to exchanges to measure, for example, usage rates, types of exchanges, frequency of exchanges, types of requests, origins of requests, and so on.

In certain embodiments, the client application program 126 may include an Internet browser program and be configured to recognize and use the proxy server 104 as a web server. In other embodiments, the proxy server 104 may be configured to recognize and interpret each protocol of a plurality of possible protocols that may be used by a client program 126. Commonly used protocols include Hypertext Transfer Protocol (HTTP), File Transfer Protocol (FTP), Telnet, and Secure Sockets Layer (SSL), for example. However, new protocols and revisions of existing protocols may be frequently introduced. Thus, in order to support a new or revised protocol, a new revision of the proxy server 104 may be continuously developed and released.

In one embodiment, the system 110 enables the development of a networked-based, e.g., Internet-based, application that may be configured and run on the application server 142, the client device 140, or a combination of the server 142 and device 140. The application server 142 may include a web server running a Web 2.0 application or the like. The device 144 may include a web browser 144 that supports Web 2.0 operations (e.g., personal media device, cellular telephone, personal computer, and the like). Web applications running on the application server 142 may use server-side dynamic content generation mechanisms such, without limitation, Java servlets, CGI, PHP, or ASP. In certain embodiments, mashed content may be generated by the web browser 144 via, for example, client-side scripting including, without limitation, JavaScript and/or applets. In one embodiment, the client-side operations of the web browser 144 include code embedded in the web pages of the application server 142 along with scripting API libraries or applets that are made available by the content provider via the application server 142. In certain embodiments, the application server 142 and the web browser 144 operate in combination to provide a user with a mashup-based service, referred to as a rich Internet application (RIA).

In certain embodiments, the application server 142 and client 140 include applications that employs asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

Figure 2:
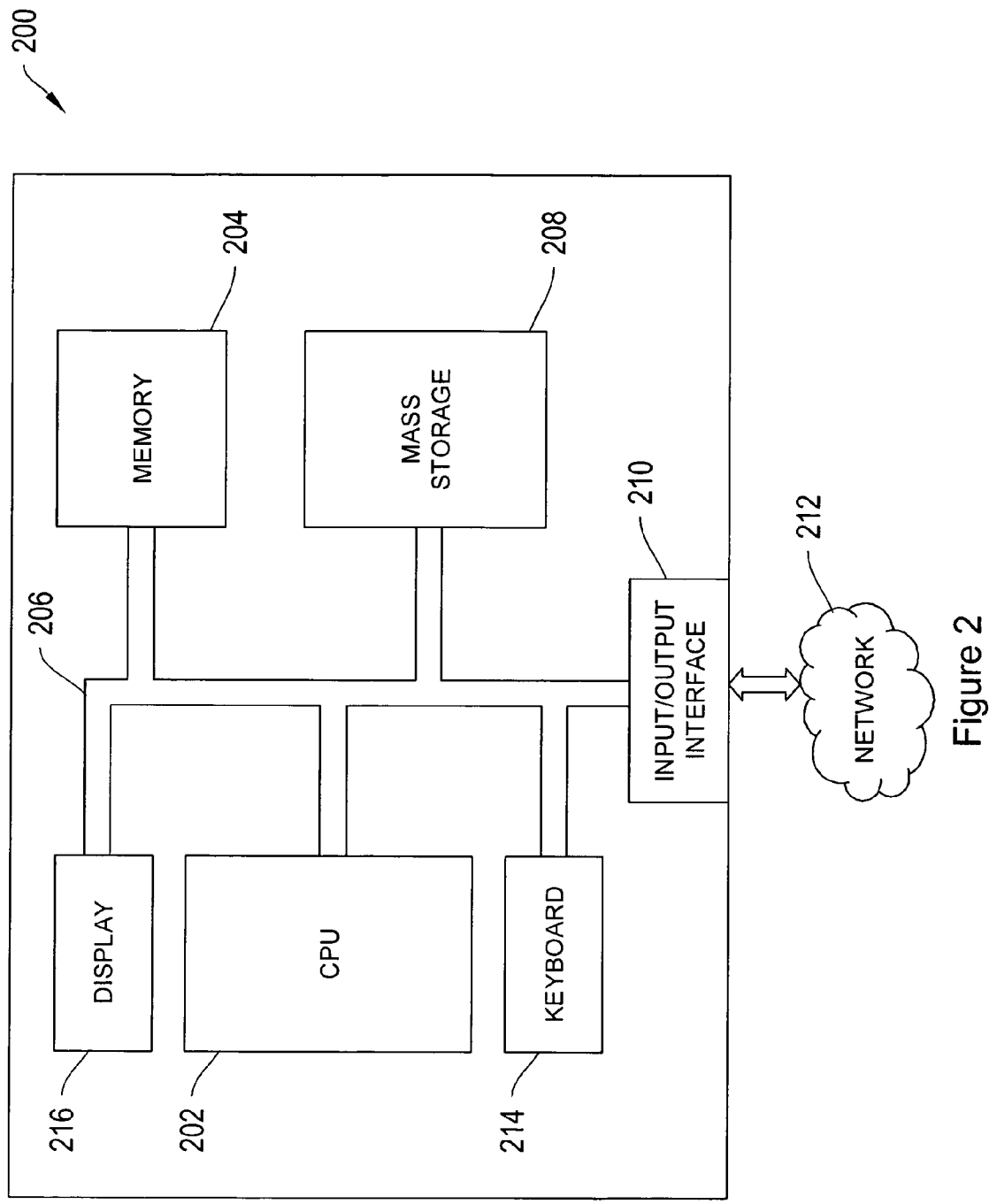
FIG. 2 is a functional block diagram of a computer for performing a proxy function according to an illustrative embodiment of the invention.

FIG. 2 shows a functional block diagram of general purpose computer system 200 for performing the functions of the computer 102 according to an illustrative embodiment of the invention. The exemplary computer system 200 includes a central processing unit (CPU) 202, a memory 204, and an interconnect bus 206. The CPU 202 may include a single microprocessor or a plurality of microprocessors for configuring computer system 200 as a multi-processor system. The memory 204 illustratively includes a main memory and a read only memory. The computer 200 also includes the mass storage device 208 having, for example, various disk drives, tape drives, etc. The main memory 204 also includes dynamic random access memory (DRAM) and high-speed cache memory. In operation and use, the main memory 204 stores at least portions of instructions and data for execution by the CPU 202.

The mass storage 208 may include one or more magnetic disk or tape drives or optical disk drives, for storing data and instructions for use by the CPU 202. At least one component of the mass storage system 208, preferably in the form of a disk drive or tape drive, stores the database used for processing the system 100 of the invention. The mass storage system 208 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 200. In one embodiment, the mass storage 208 includes a plurality of storage devices or media that are interconnected via a communications network. The plurality of storage media may interact such that the storage media function as a virtual mass storage system 208. One or more of the plurality of storage media may reside in separate locations while being interconnected electronically.

The computer system 200 may also include one or more input/output interfaces for communications, shown by way of example, as interface 210 for data communications via the network 212. The data interface 210 may be a modem, an Ethernet card or any other suitable data communications device. To provide the functions of a computer 102 according to FIG. 1, the data interface 210 may provide a relatively high-speed link to a network 212, such as an intranet, internet, or the Internet, either directly or through an another external interface. The communication link to the network 212 may be, for example, optical, wired, or wireless (e.g., via satellite or 802.11 Wifi or cellular network). Alternatively, the computer system 200 may include a mainframe or other type of host computer system capable of Web-based communications via the network 212.

The computer system 200 also includes suitable input/output ports or may use the interconnect bus 206 for interconnection with a local display 216 and keyboard 214 or the like serving as a local user interface for programming and/or data entry, retrieval, or manipulation purposes. Alternatively, server operations personnel may interact with the system 200 for controlling and/or programming the system from remote terminal devices via the network 212.

The computer system 200 may run a variety of application programs and store associated data in a database of mass storage system 208. One or more such applications may enable the system 200 to function as a proxy server that monitors and controls access to certain API information being requested by remote development systems.

The components contained in the computer system 200 are those typically found in general purpose computer systems used as servers, workstations, personal computers, network terminals, portable devices, and the like. In fact, these components are intended to represent a broad category of such computer components that are well known in the art. Certain aspects of the invention may relate to the software elements, such as the executable code and database for the server functions of the proxy application 104.

As discussed above, the general purpose computer system 200 may include one or more applications that control and monitor access to APIs in accordance with embodiments of the invention. The system 200 may include software and/or hardware that implements a web server application. The web server application may include software such as HTML, XML, WML, SGML, PHP (Hypertext Preprocessor), CGI, and like languages.

The foregoing embodiments of the invention may be realized as a software component operating in the system 200 where the system 200 is Unix workstation or other type of workstation. Other operation systems may be employed such as, without limitation, Windows and LINUX. In that embodiment, the proxy 104 software can optionally be implemented as a C language computer program, or a computer program written in any high level language including, without limitation, C++, Fortran, Java, or Visual BASIC. Certain script-based programs may be employed such as XML, WML, PHP, and so on. Additionally, general techniques for high level programming are known, and set forth in, for example, Stephen G. Kochan, Programming in C, Hayden Publishing (1983). Developing code for the DSP and microcontroller systems follows from principles well known in the art.

As stated previously, the mass storage 208 may include a database. The database may be any suitable database system, including the commercially available Microsoft Access database, and can be a local or distributed database system. The design and development of suitable database systems are described in McGovern et al., A Guide To Sybase and SQL Server, Addison-Wesley (1993). The database can be supported by any suitable persistent data memory, such as a hard disk drive, RAID system, tape drive system, floppy diskette, or any other suitable system. The system 200 includes a database that is integrated with the system 200, however, it will be understood by those of ordinary skill in the art that in other embodiments the database and mass storage 208 can be an external element.

In certain embodiments, the present invention enables tracking and regulating of access to APIs, web services, web-based APIs, and data feeds. Currently, most APIs are either openly accessible or include access control capabilities as part of an API. The present invention allows for a proxy 104 to act as a communications intermediary between the program calling the API, e.g., application 126, and the API itself, e.g., API 128, 130, 132, 134, and/or 136. In one embodiment, the proxy 104 captures an access key contained in the API call and may use that key for several purposes including, without limitation: 1) Capturing and displaying data at, for example, owner systems 118, on how the API is accessed, including who is accessing it, how they are accessing it, and where they are accessing it from; 2) Limiting the number of times per second the API 128 can be called from a given developer system 110 or IP address; and 3) Counting down to a maximum number of calls per day, week or month. Once the limit is reached, access can be turned off, or the user's/developer's account can be charged for access, or a notification can take place.

In one embodiment, the proxy 126 can operate either at a third-party facility or in one or more appliances within the API provider's data center facility. In another embodiment, Web pages that are produced using data pulled from the proxied API 128 contain code that will alert a monitor system, such as systems 118, 120, or 138, that it has been called. This code can also sense what other web services are being used on that page. With this information, web page calls can be matched to back-end API calls in order to ensure that the back-end calls match to particular web pages, and in order to allow the API provider or owner 118 to ensure that the use is consistent with their policies.

In another embodiment, the proxy 104 provides caching, load balancing and other performance improvements. The proxy 104 may also provide enhanced security and data encryption. Enhanced security may include access control, cryptographic authentication, message integrity checking, encryption, digital rights management services, and other like security services. The security may include protocols such as IPSEC and IKE. The encryption may include, without limitation, DES, AES, RSA, and any like public key or private key based schemes.

In one embodiment, a particular API developer key is authorized to use certain API "methods" and/or elements. The proxy 104 may regulate access to the API by any combination of one or more of the following criteria:

Developer (as identified by developer key)
What format the data arrives in or are requested in (SOAP, JSON RPC, XML RPC, REST, etc)
IP address of the call origination
Geographic location of the call origination
Referrer URL of the call origination
Device or browser or "user agent" making the call
Actual data within the call or the request—e.g., anything that appears in the header or the payload.

In certain embodiments, the proxy 104 provides and/or supports two-tier authentication whereby a particular developer can access the private information of a particular user. For instance, a developer may build and/or create an application that accesses a particular API, e.g., flickr API, which may be an extension to a photo management application, e.g., iPhoto, running on a user's PC. The user may want the developer's application to access the user's personal photo account on the Flickr website. The proxy 104 and/or flickr website may include a table that indicates which accounts can be accessed by which third-party and/or developer applications.

Figure 3:
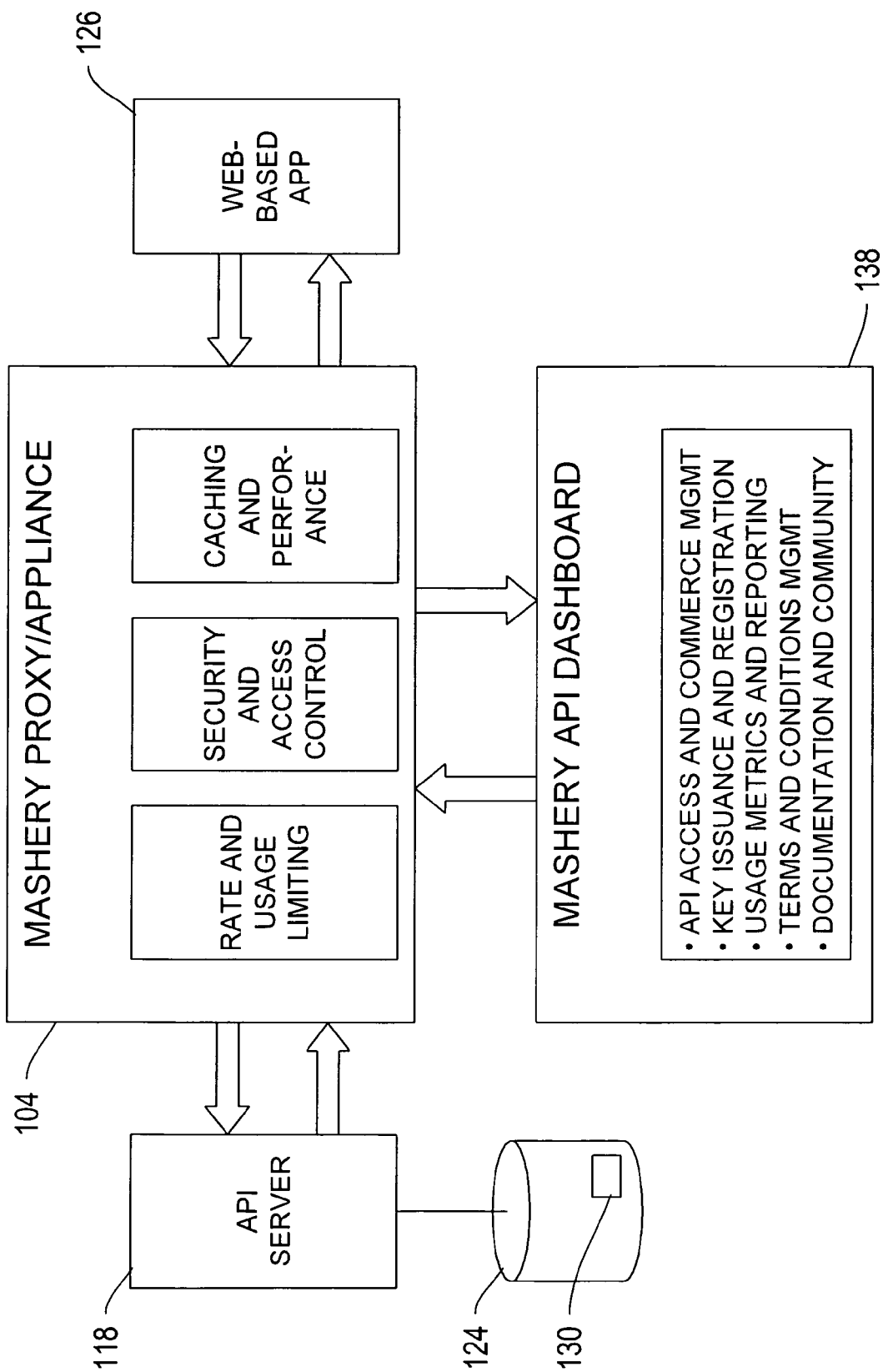
FIG. 3 is a functional block diagram of the proxy according to an illustrative embodiment of the invention.

FIG. 3 is a functional block diagram of a proxy 104 and related monitor application 138 of a provider including various capabilities according to an illustrative embodiment of the invention. The monitor application 138 may be a software application running on any one or combination of the systems 102, 118, 120, or 138. The monitor application may interface with a display or other GUI to enable interaction with a user. The monitor application 138 may run on a portable computing device such as a cellphone, PDA, portable computer, and like device capable of remotely communicating with the proxy 104.

The proxy 104 may include one or more routines, applications, or units such as, without limitation: 1) a rate and usage limiting unit 302, 2) a security and access control unit 304, and 3) a caching and performance monitoring unit 306. The unit 302 may be implemented as a software application or subroutine (or other like code) of the proxy 104. The unit 302 may perform functions such as limiting the number of times per second the API 128 can be called from a given developer system 110 or IP address or maintain a count of the number of API calls per day, week or month and comparing the count with a predefined limit setting. Once the limit is reached, access can be turned off, or the user's/developer's account can be charged for additional access, or a notification can take place. The unit 304 may authenticate API call requests using any one or combination of known cryptographic or password-based authentication schemes. For example, unit 304 may capture an access key contained in an API call and check that the access key is the proper access key associated with a particular developer system 122 or 110. The unit 304 may interface with a database 106 containing a list of authorized developer systems and their associated access key information. If the access key is proper, the unit 304 may then authorized the access to an API or other services provided by the proxy 104. The unit 306 may enable the capture and display of data regarding how the API 130 is accessed, including who is accessing it, how they are accessing it, and where they are accessing it from. The unit 306 may also provide caching, load balancing of access requests, and other performance improvements The monitor application 138 may provide information via a GUI to a user of an API provider including, without limitation, to enable 1) API access and commerce management, 2) key issuance and registration, 3) usage metrics and reporting, 4) terms and conditions management, and 5) documentation and developer community information. The monitor application may interface with the proxy 104 directly or indirectly to provide any one of the above services.

In certain embodiments, the proxy 104 provides real-time access to elements (routines, functions, code, procedures, etc. . . . ) of an API to a web-based application operating as a run-time application or a web-based application that is formed, made, linked, and/or compiled at run-time.

In certain embodiments, the dashboard server 138 enables an API provider, owner, distributor, supervisor, and/or controller to monitor developer access statistics to one or more APIs. The server 138 may include a reporting engine that presents certain access information in summaries or snapshots showing how a particular API is being used, which developers are using the particular API, when developers are using an API, and how often or how much developers are using an API. The engine may also provide information regarding the size of a developer group and the reach of the API distribution channel. The server 138 may include a web server application or engine that presents various API and developer related information via a web-based interface or series of web pages.

Figure 4:
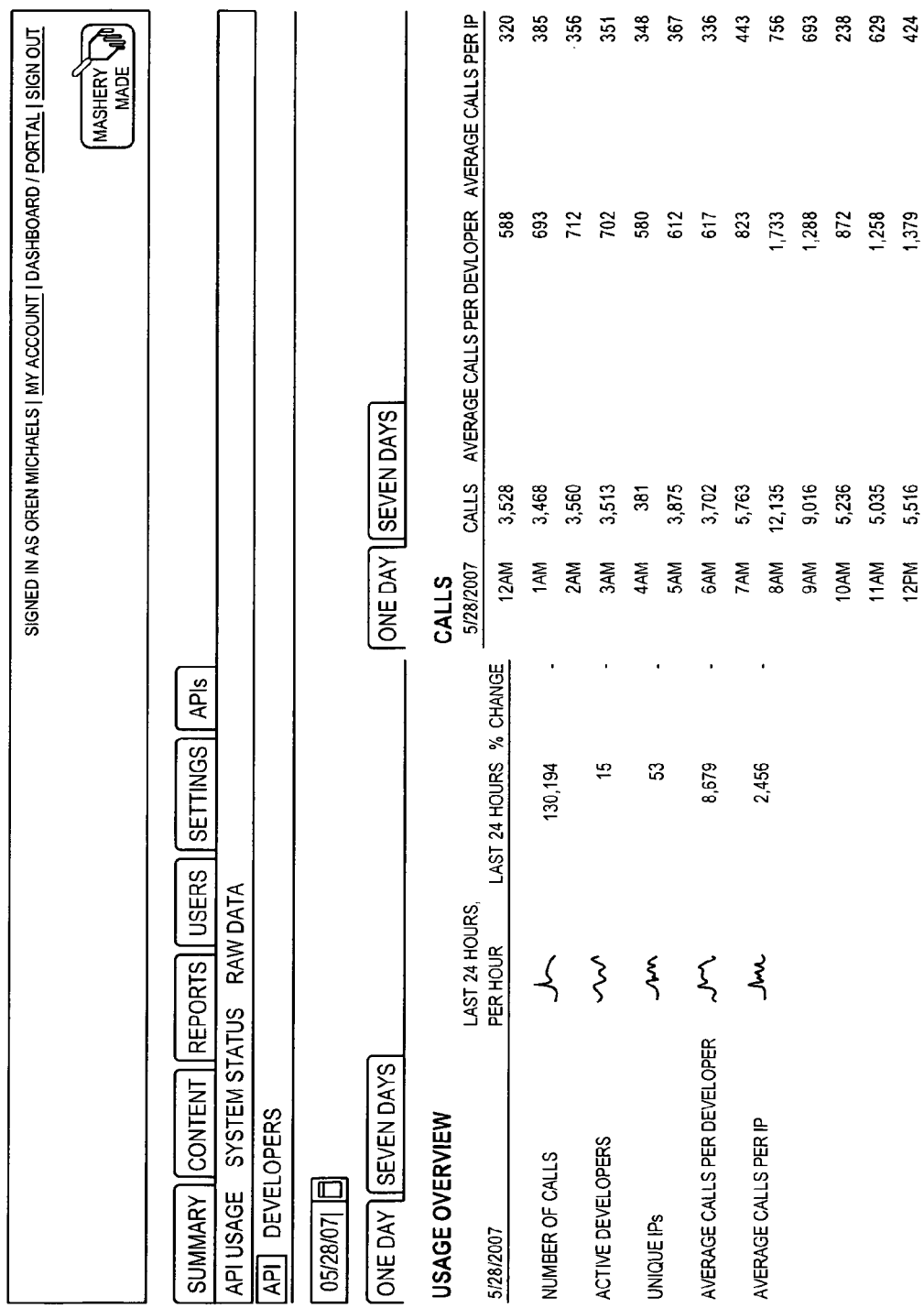
FIG. 4 shows a web page displaying API access information over a day period according to an illustrative embodiment of the invention.

FIG. 4 shows a web page 400 displaying API access information over a day period according to an illustrative embodiment of the invention. The web page 400 may include information such as usage trends, usage plots, API access/usage amounts over a period of time, average API calls per developer, and average API call per IP address.

Figure 5:
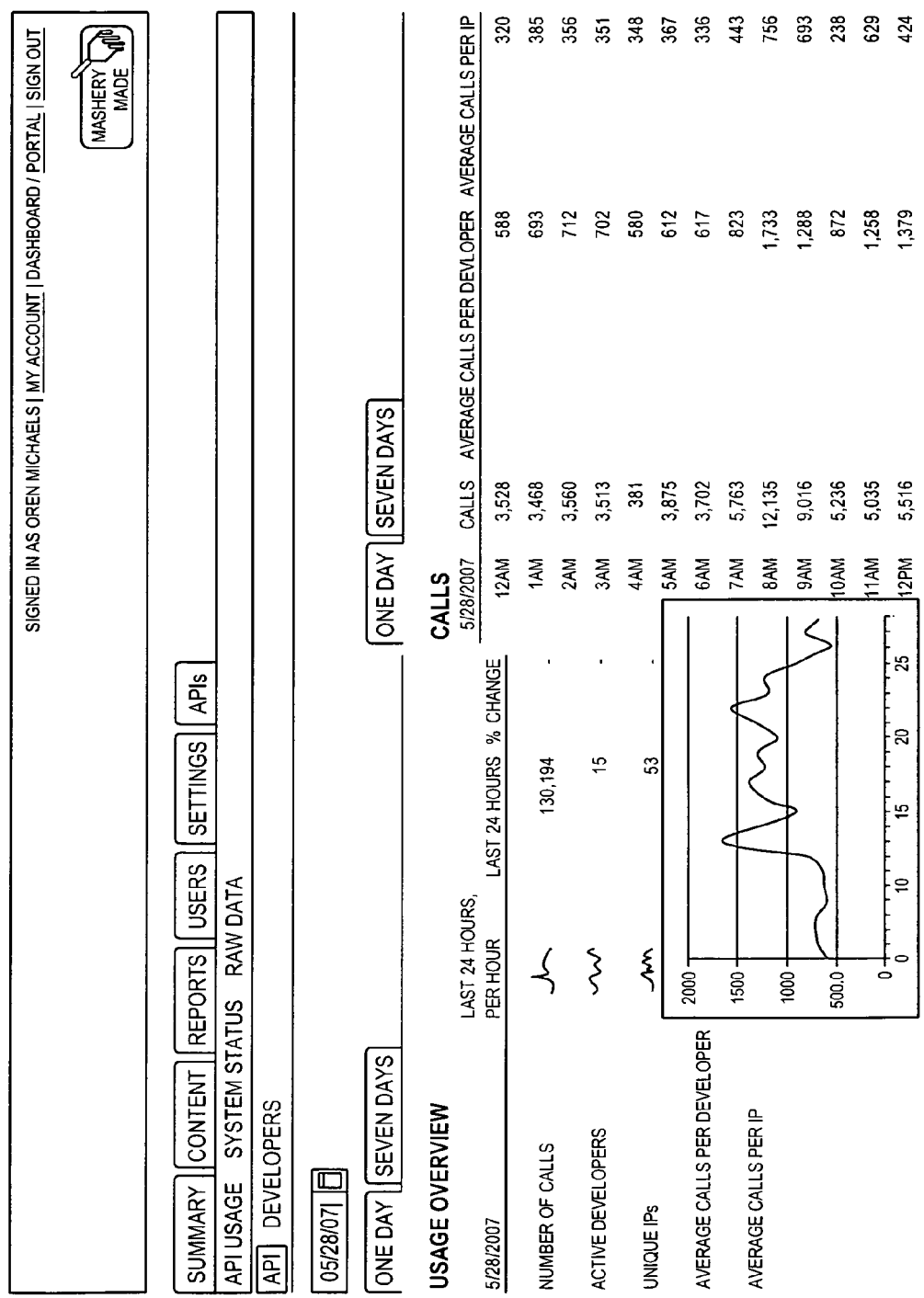
FIG. 5 shows the web page of FIG. 4 including an expanded view of average calls per developer according to an illustrative embodiment of the invention.

FIG. 5 shows a web page 500 including an expanded view of a plot of average calls per developer over a 24 hour period according to an illustrative embodiment of the invention. In certain embodiments, an API owner is able to click on a portion of a web page access another page or to activate a window such as window 502 showing more detailed API and/or developer information.

Figure 6:
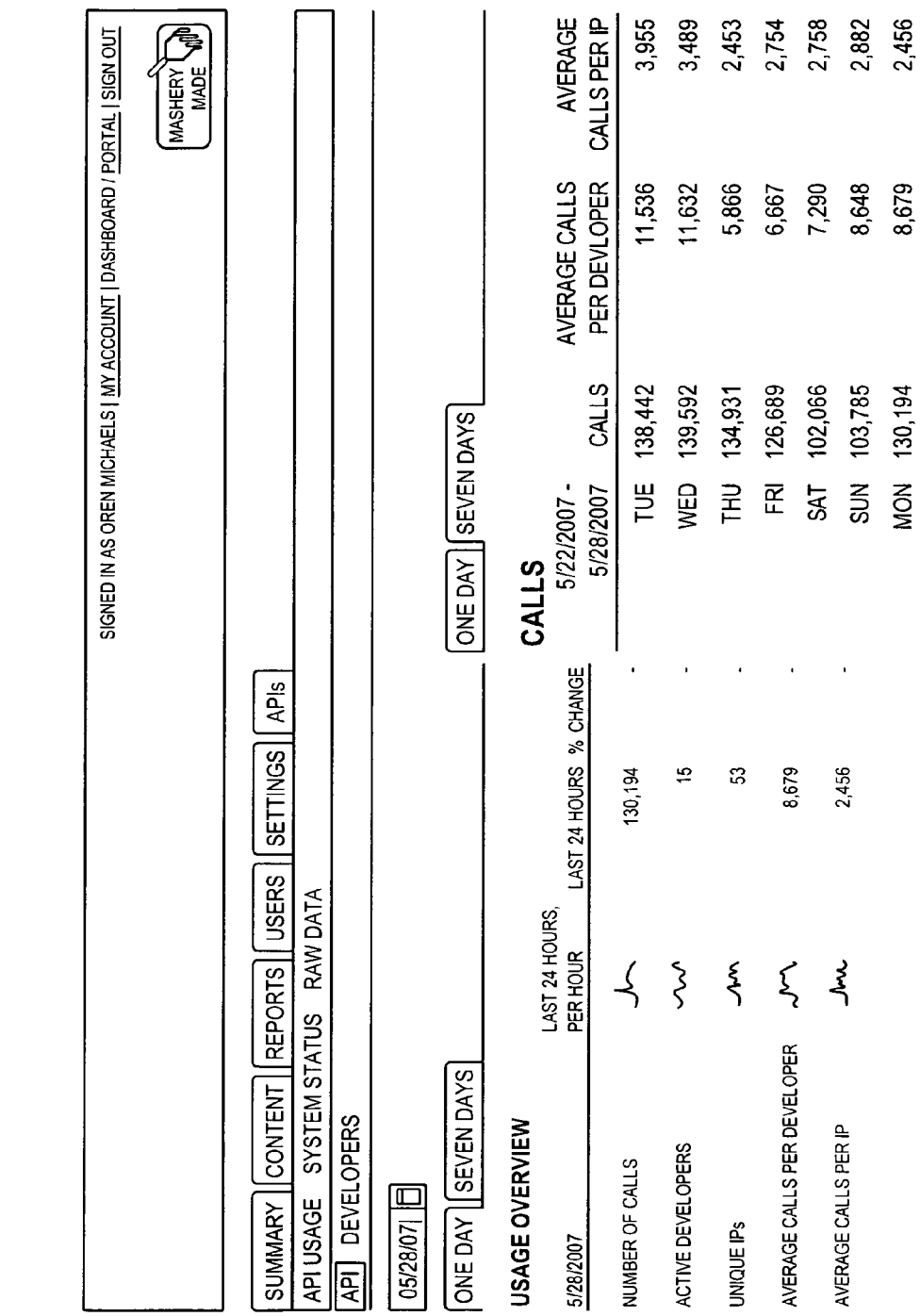
FIG. 6 shows a web page displaying API access information over a seven day period according to an illustrative embodiment of the invention.

FIG. 6 shows a web page 600 displaying API access information over a seven day period according to an illustrative embodiment of the invention.

Figure 7:
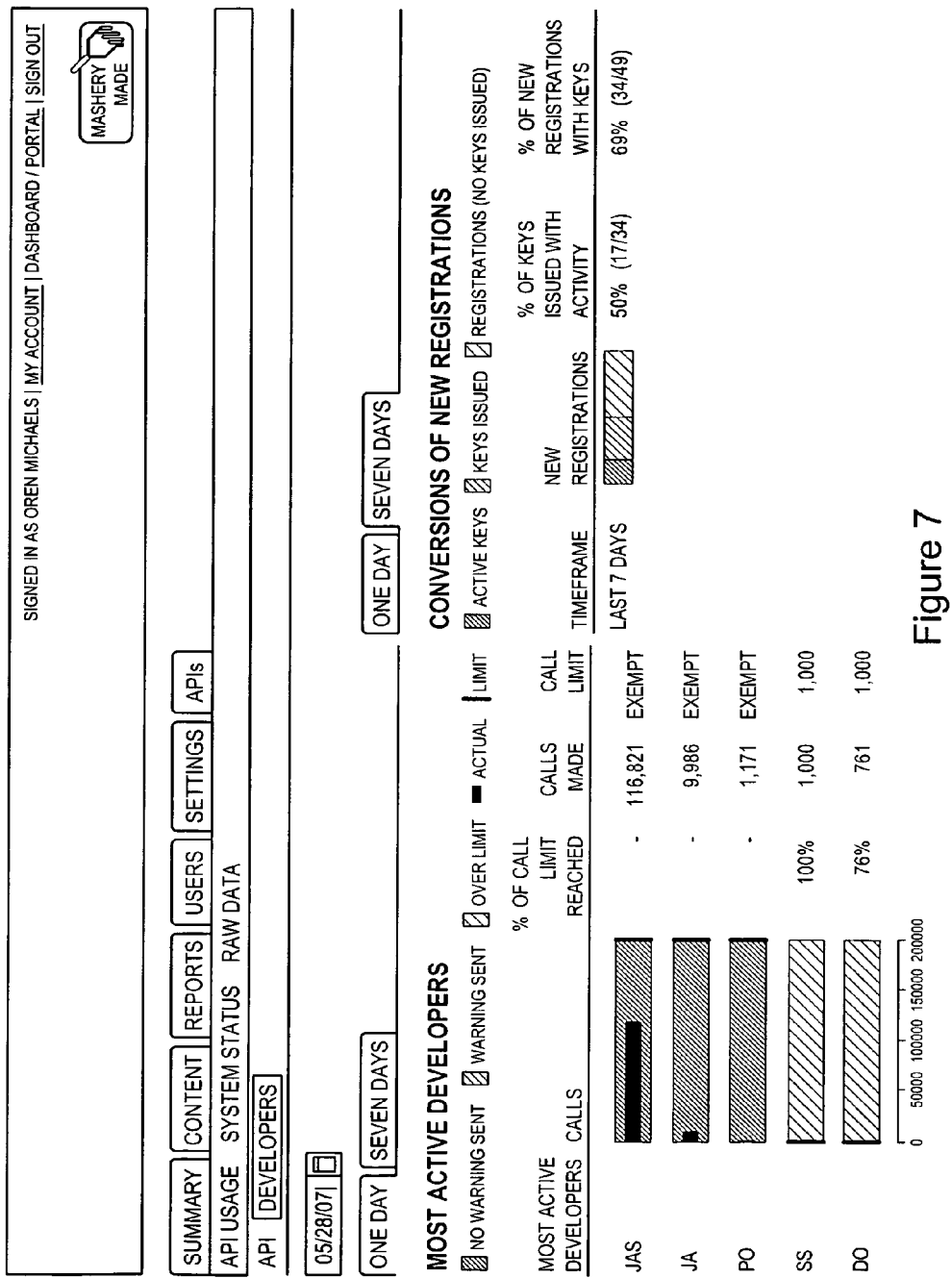
FIG. 7 shows a web page displaying an overview of the most active developers over a period of time according to an illustrative embodiment of the invention.

FIG. 7 shows a web page 700 displaying an overview of the most active developers over a period of time according to an illustrative embodiment of the invention. The web page 700 may display information regarding new developer signups for API access, how many developers registered for developer API keys, and how many of the API keys were used to make API calls. The web page 700 may also display which developers/users have reached their call and/or usage limits, and have had their access restricted.

Figure 8:
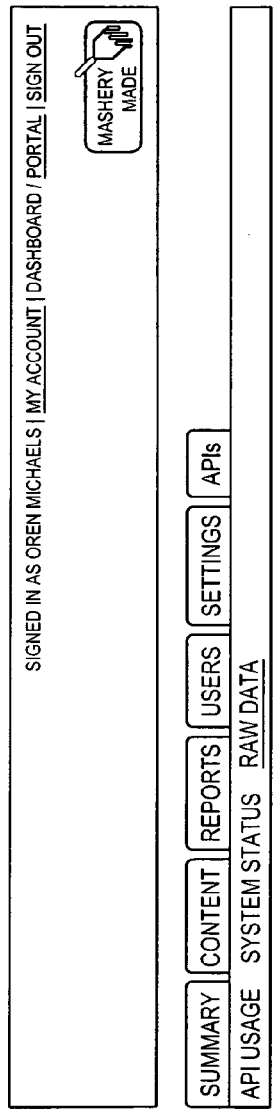
FIG. 8 shows a web page displaying raw data associated with various developers that accessed an API over a period of time according to an illustrative embodiment of the invention.

FIG. 8 shows a web page 800 displaying raw data associated with various developers that accessed an API over a period of time according to an illustrative embodiment of the invention.

Figure 9:
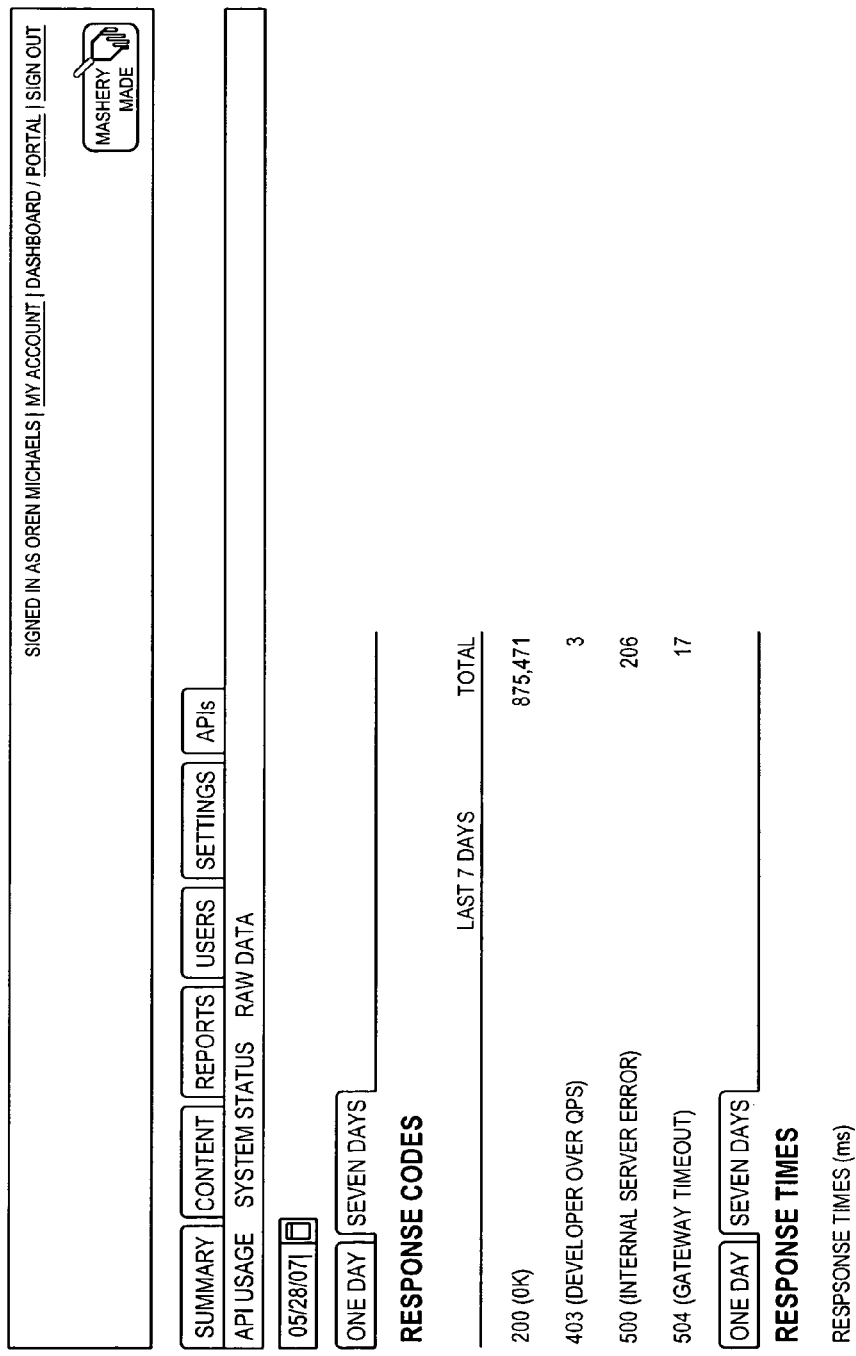
FIG. 9 shows a web page displaying system responses to various developer API requests over a period of time according to an illustrative embodiment of the invention.

FIG. 9 shows a web page 900 displaying system responses to various developer API requests over a period of time according to an illustrative embodiment of the invention. The API responses may include, without limitation, API errors (e.g., when the proxy server 104 is unable to reach the API server 118, or that the API server 118 returned an error) and excess or improper developer usage (over usage or query-per-second usage or invalid API key). The proxy 104 may allow each API owner or provider to specify an error code and/or message for each type of error that an API call can generate. In one embodiment, an API server 118 returns a status message, e.g., 200 OK, for all API calls, but if there is an error, the error is indicated in the message body. In one embodiment, the API server and/or proxy 104 returns a 403 or other error code that indicates the reason for the error in a message header. The web page 900 may also display mean API server response time, along with a range of response times from highest to lowest.

Figure 10:
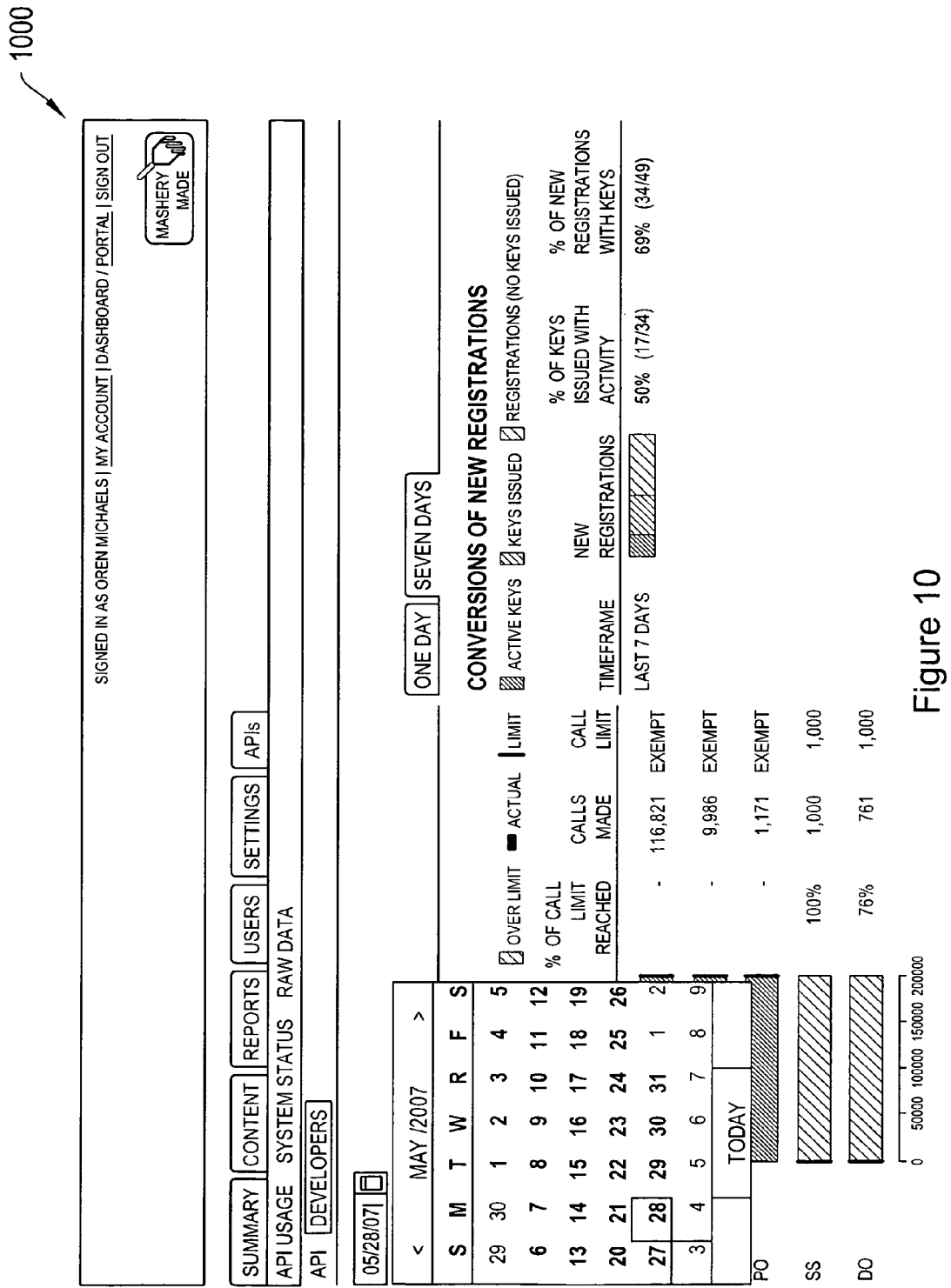
FIG. 10 shows a web page displaying an exploded calendar to enable a user to navigate to a desired period of time according to an illustrative embodiment of the invention.

FIG. 10 shows a web page 1000 displaying an exploded calendar to enable a user to navigate to a desired period of time according to an illustrative embodiment of the invention.

Figure 11:
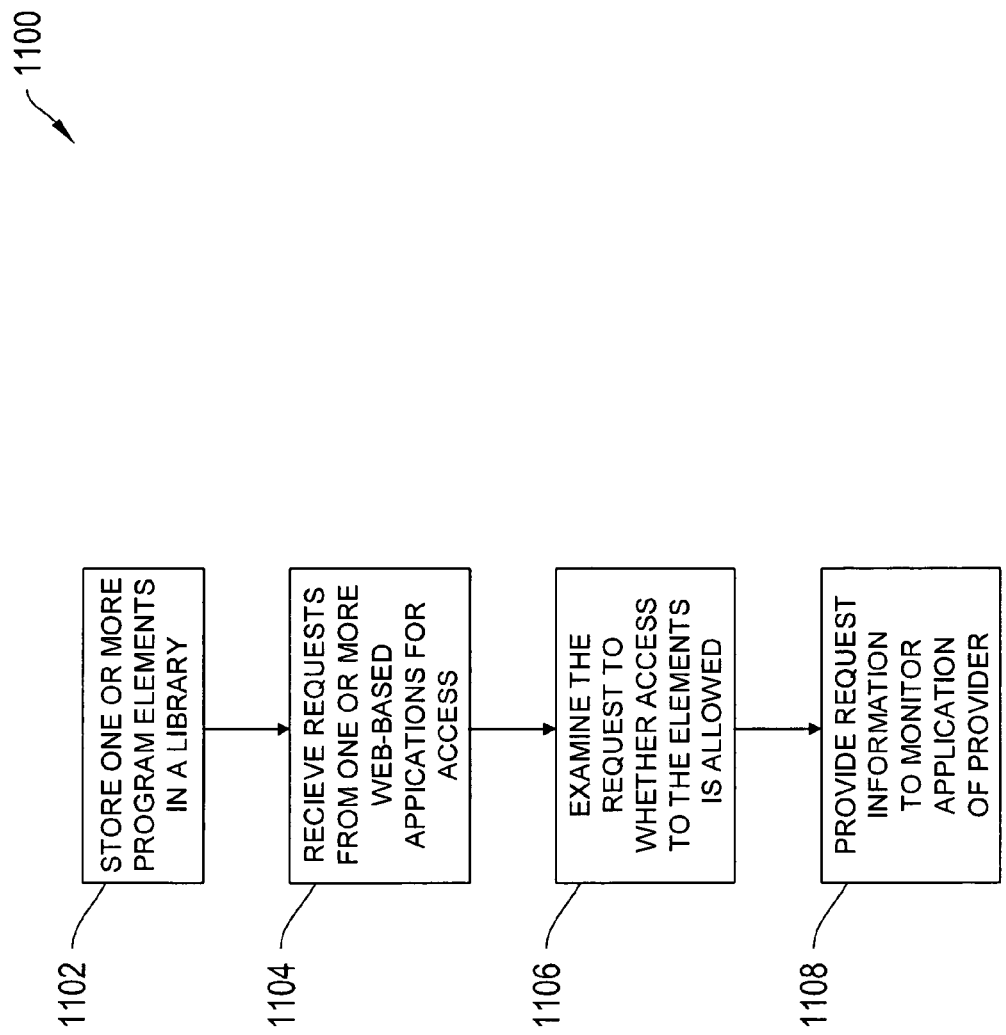
FIG. 11 is a process for controlling and monitoring developer access to an API according to an illustrative embodiment of the invention.

FIG. 11 shows a process 1100 for controlling and monitoring developer access to an API according to an illustrative embodiment of the invention. First, one or more program elements are stored in a database (Step 1102) of an API server such as API server 118. The program elements may include software scripts, executable files, executable routines, executable subroutine, functions, software code, and the like. The database may include a library of program elements. The collection of elements may be referred to as an API. Next, a proxy server 104 receives requests from one or more web-based applications for access to the one or more program elements (Step 1104). Then, the proxy server 104 examines the request to determine whether access to the one or more program elements is allowed from the one or more web-based application programs (Step 1106). Then, a monitoring application that interacts with or is part of the proxy server 104 provides information associated with the requests and/or API calls (Step 1108).

In certain embodiments, the proxy server 104 supports at least two forms of rate limiting for access to an API. The first form is where the API provider specifies how many API calls per second that the API server 118 will accept from a particular developer key to avoid a particular developer from overloading the API server 118 from a burst of API calls. If the developer exceeds the limit, the proxy server 104 may send an HTTP/1.1 403 error ("Forbidden—Over rate limit") until the next second begins. The second form is where the API provider specifies how many calls each developer key can make over a predetermined period of time (e.g., day, week, or month). If the developer exceeds the limit, the proxy server 104 may return a 403 error, issue a notification but continue to allow access, issue notification but allow access up to a certain high level of overage, and/or accept traffic up to a certain level for free, but charge for additional access that exceeds the free limit.

In one embodiment, the proxy server 104 generates and issues API developer keys. Each API developer key may include a randomly or pseudo-randomly generated characters. In one embodiment, the API developer key includes 24 characters. In another embodiment, the API developer key is generated based in part on microprocessor timing information and/or randomly generated salts.

In certain embodiments, the proxy server 104 allows an API provider/owner to build and control their API channels without burdening in-house staff with the headaches of access control, usage measurement and community management by providing security, control, scale and community support.

The proxy server 104 may provide security services for API distribution including access control, authentication and usage management. In one configuration, the proxy server 104 and/or a dashboard server 138 supports a real-time view of who is using an API owner's web service and how the service is being used while guarding against misuse. In on embodiment, the proxy 104 is configured to issue API developer keys, provision new web service customers in real-time, and grant additional privileges to trusted users. The proxy server may support, without limitation: 1) Customer provisioning, developer registration and key issuance, 2) Regulated web service access and authentication (native and third party), 3) a Proxy that blocks all but approved requests from reaching API server 118, and 4) Security access reports, metrics and audit logs The proxy server 104 may provide control services that include, without limitation, API call metering, metrics and management. Control and transparency requirements may range from metering and enforcing access limits to a wide array of usage metrics. The proxy server 104 and/or dashboard server 138 may support a set of metrics and reports (See FIGS. 4-10) that give an API owner the tools to analyze how their service is being accessed and used across their customer base. Management features may include: 1) Configurable web service usage and access limits, 2) Uptime, performance and availability monitoring, 3) Rule-based, configurable web service charging and billing.

In certain embodiments, the proxy server 104 supports scalability including caching, throttling and dynamic provisioning. The proxy server 104 enables an API owner to improve their web service performance across an entire customer base, resulting in enhanced performance for all your customers. In one embodiment, the proxy server 104 includes intelligent caching capabilities whereby the proxy server 104 pushes the results of the most frequently accessed web service calls right to the edge of the network. Along with rate limiting functionality, the proxy server 104 can define and enforce rules to throttle an individual developer/customer's web service usage. Key scaling features include, without limitation: 1) Intelligent caching, 2) Usage throttling and limiting, and 3) Dynamic, rules-based provisioning.

The proxy server 104 enhances the API and/or web service provider's ability to establish a robust developer community. In one embodiment, the proxy server 104 supports a comprehensive set of developer and community tools. Developers can annotate documentation with comments. The proxy server 104 may support a developers' blog, forum and wiki that can be moderated and controlled by the API owner. The proxy server 104 may present various developer tools and other information in the web service owner's look and feel, with a single sign-on for all tools. Key developer and community tool features may include, without limitation: 1) Fully-integrated and hosted web service blog, wiki, annotated documentation and forum, 2) Full control of site CSS for true custom "skin" and, 3) Content management, versioning and change control.

In certain embodiments, the proxy 104 may be distributed and/or operate in a geographically distributed way. For example, API calls from Boston, Mass. may be routed to an east-coast proxy, while calls from Singapore may be routed through an Asian-based proxy. In one embodiment, rules may be applied and reports generated across all proxies instances and/or elements of the proxy 104. The distributed proxy 104 may include two or more proxy servers operation in conjunction with each other to perform the proxy 104 functions.

In another embodiment, the proxy sever 104 provides regulation, management and metrics without actually proxying an API call. Consider an API that provides access to a video stream from a widget on a web page. The widget can send the query to the proxy server 104, whereupon, the proxy server 104 evaluates at least one of a developer key, business rules, an so on, and then issues an "allow/deny" to the widget or a one-time access URL that the widget then uses to retrieve the video content.

In a further embodiment, the proxy server 104 supports a third party counting API. Because the proxy server 104 can parse out any information from a REST or JSON call (or other like protocol), the proxy server 104 can allow entities to ping the proxy server(s) 104 with API and/or application calls that are not expecting any response, but which have information they want parsed out of them and counted, so that the caller can receive reporting on the information. This may advantageous uses including, without limitation:

A person who writes a widget can have it hit the proxy server 104 each time a user clicks on a button within the widget, so the proxy server 104 can gather information on what happens within the widget. Existing solutions such as Google Analytics simply track the fact that the page with the widget was loaded (and where the person arrived from, how long they stayed, etc), but not what actually happened within the page.

A person with a non-browser-based application can use the proxy server 104 to capture activity and usage information. For example, because Google Analytics javascript runs on a browser, a plug-in, such as an iTunes plug-in, that pulls data from an API, the proxy server 104 can still gather analytics by having the plug-in and/or application hit the proxy server 104.

FIGS. 12-21 shows various dashboard screenshots according to an illustrative embodiment of the invention. The dashboard screenshots illustrate various monitoring and control features of the API dashboard 138 which may be implemented on a remote server or local server (to the proxy server 104). The API dashboard may include a web browser and/or web interface to enable a user to input configuration information or view other various statistical and/or configuration information.

Figure 12:
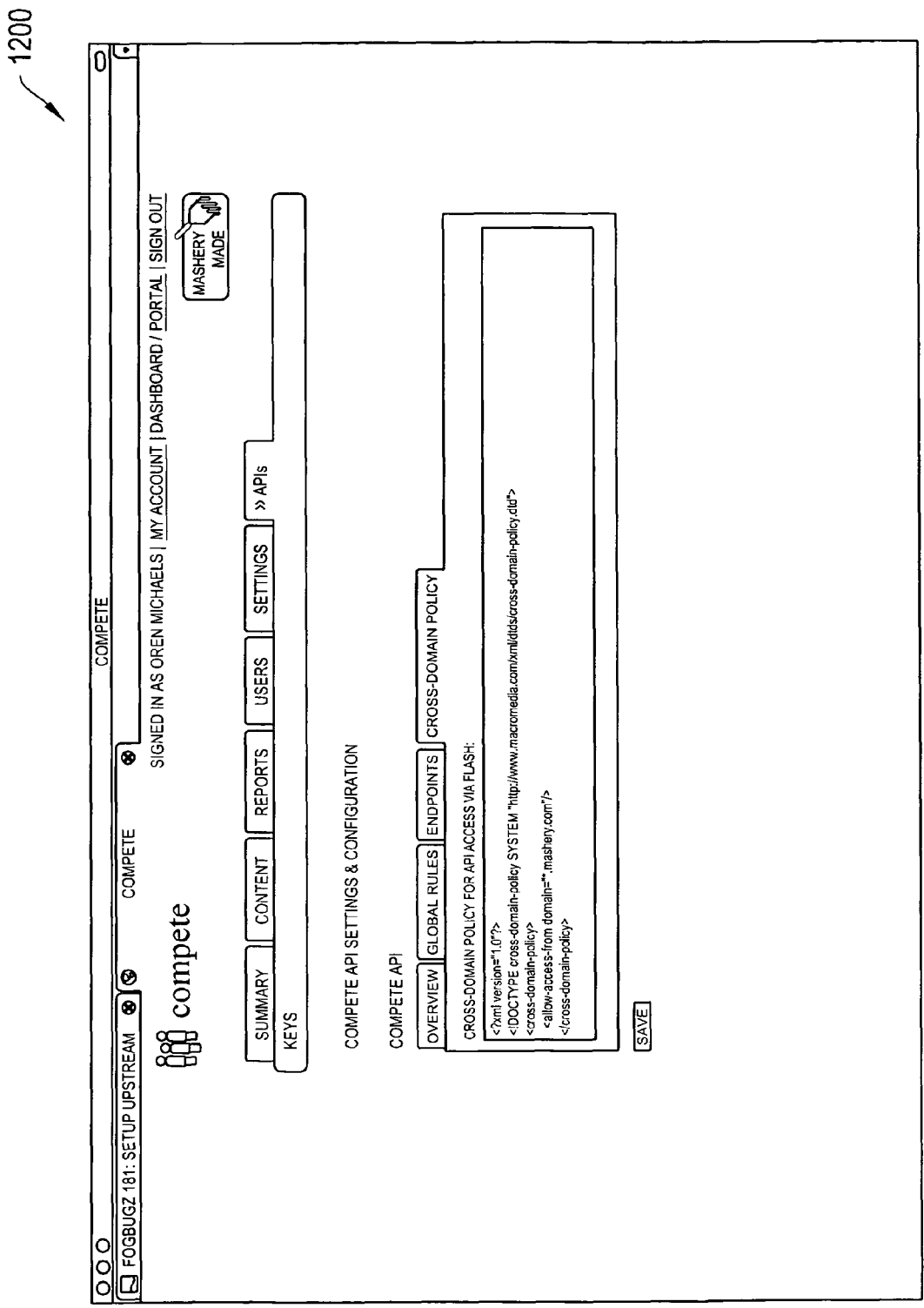
FIG. 12 shows a web page 1200 displaying a cross-domain policy for API access according to an illustrative embodiment of the invention.

FIG. 12 shows a web page 1200 displaying a cross-domain policy for API access according to an illustrative embodiment of the invention.

Figure 13:
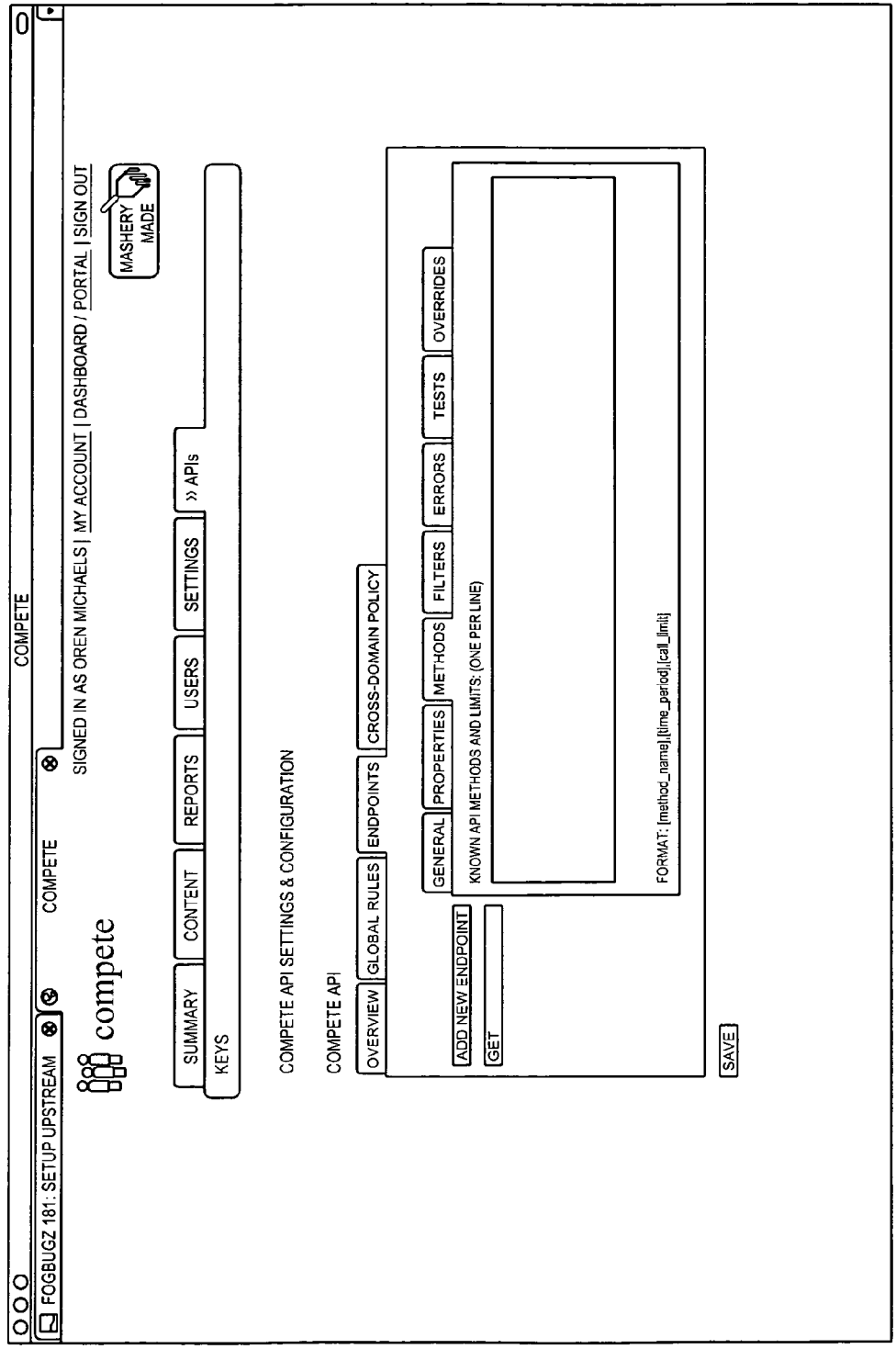
FIG. 13 shows a web page 1300 displaying know API methods and limits according to an illustrative embodiment of the invention.

FIG. 13 shows a web page 1300 displaying know API methods and limits according to an illustrative embodiment of the invention.

FIG. 14 shows a web page 1400 displaying endpoint configuration override settings/inputs according to an illustrative embodiment of the invention.

Figure 15:
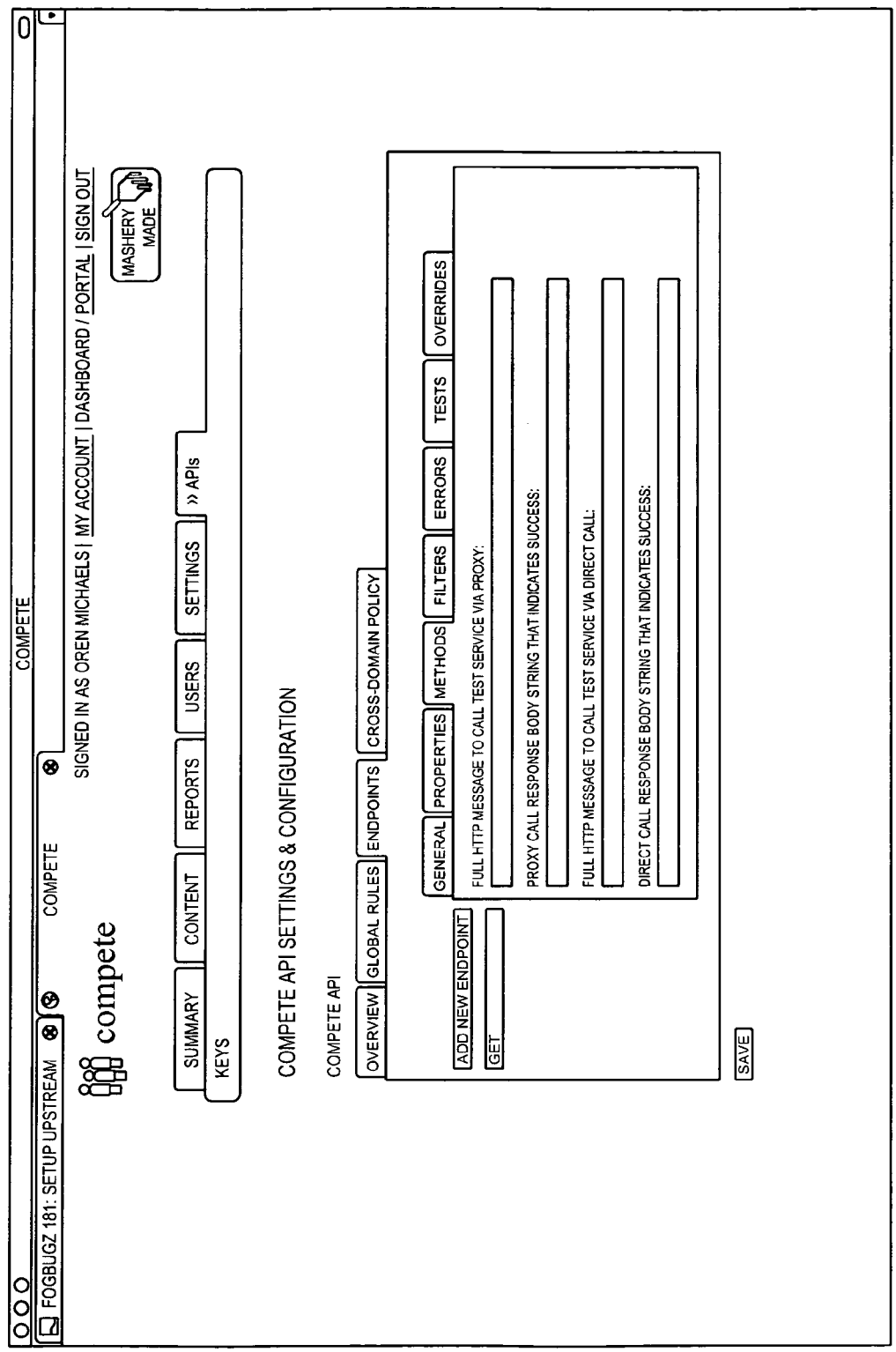
FIG. 15 shows a web page 1500 displaying endpoint configuration test settings/inputs according to an illustrative embodiment of the invention.

FIG. 15 shows a web page 1500 displaying endpoint configuration test settings/inputs according to an illustrative embodiment of the invention.

Figure 16:
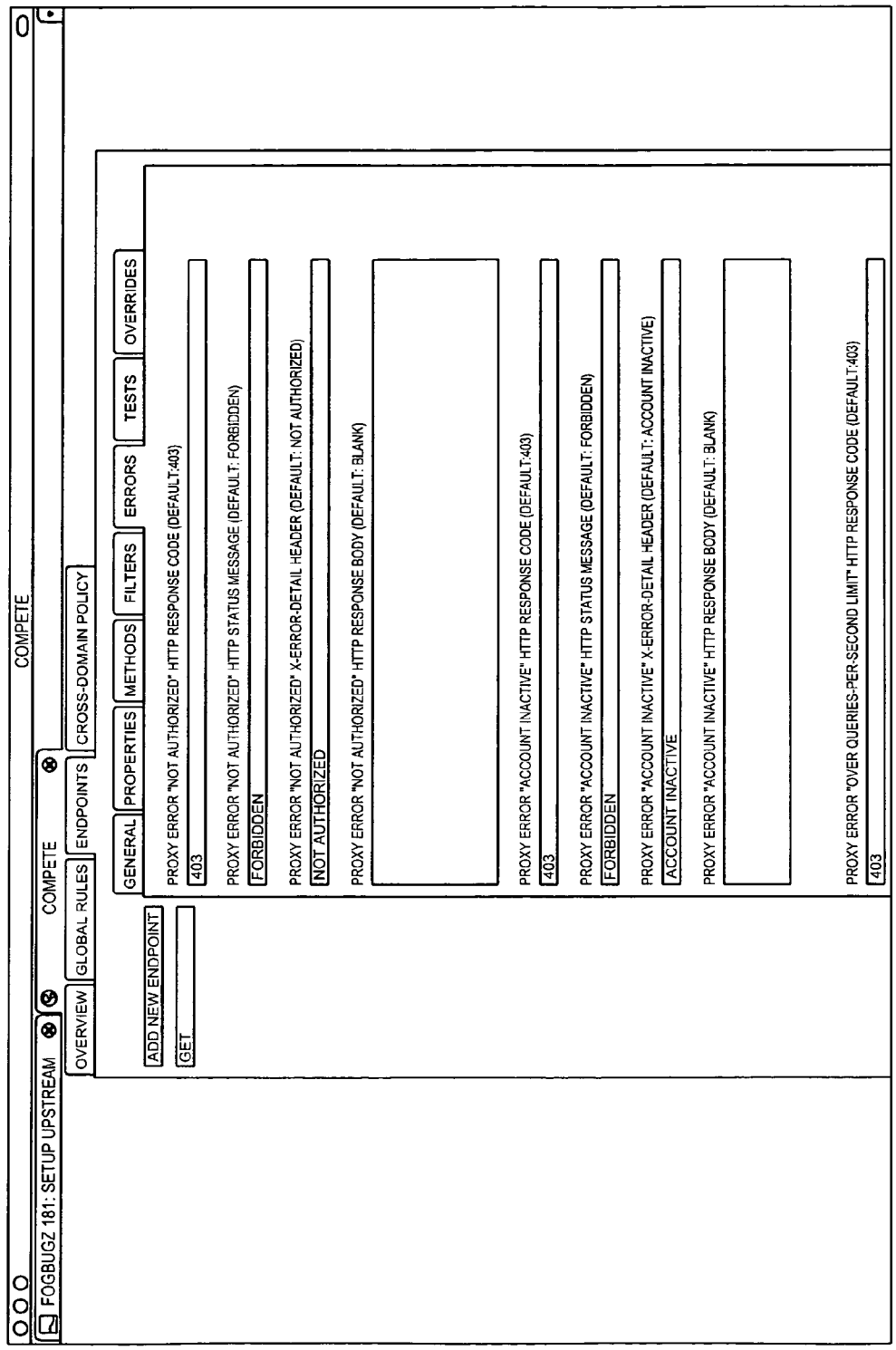
FIG. 16 shows a web page 1600 displaying endpoint error configuration settings according to an illustrative embodiment of the invention.

FIG. 16 shows a web page 1600 displaying endpoint error configuration settings according to an illustrative embodiment of the invention.

Figure 17:
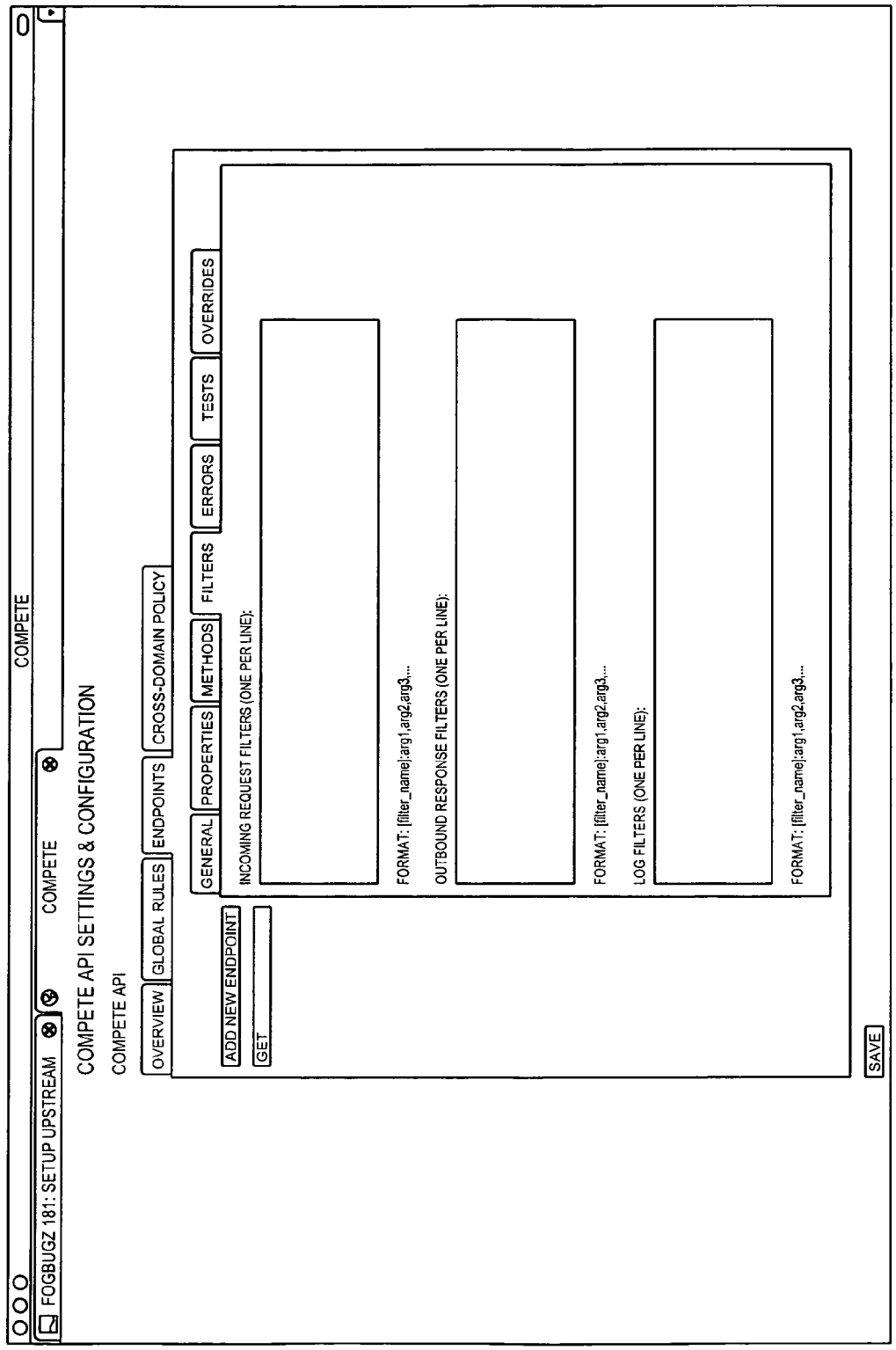
FIG. 17 shows a web page 1700 displaying endpoint filter configuration settings/inputs according to an illustrative embodiment of the invention.

FIG. 17 shows a web page 1700 displaying endpoint filter configuration settings/inputs according to an illustrative embodiment of the invention.

Figure 18:
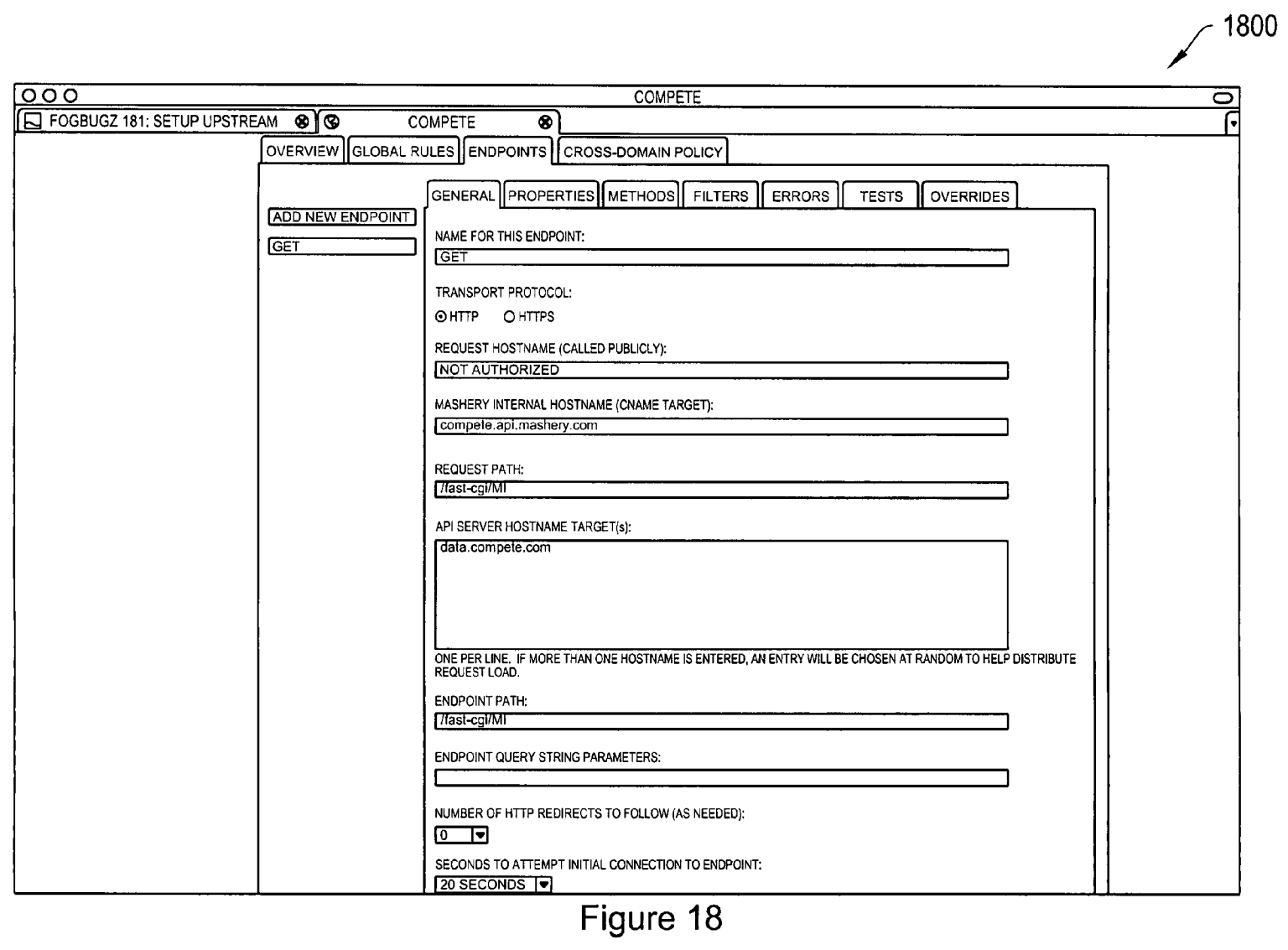

FIG. 18 shows a web page 1800 displaying various endpoint configuration settings/inputs according to an illustrative embodiment of the invention.

Figure 19:
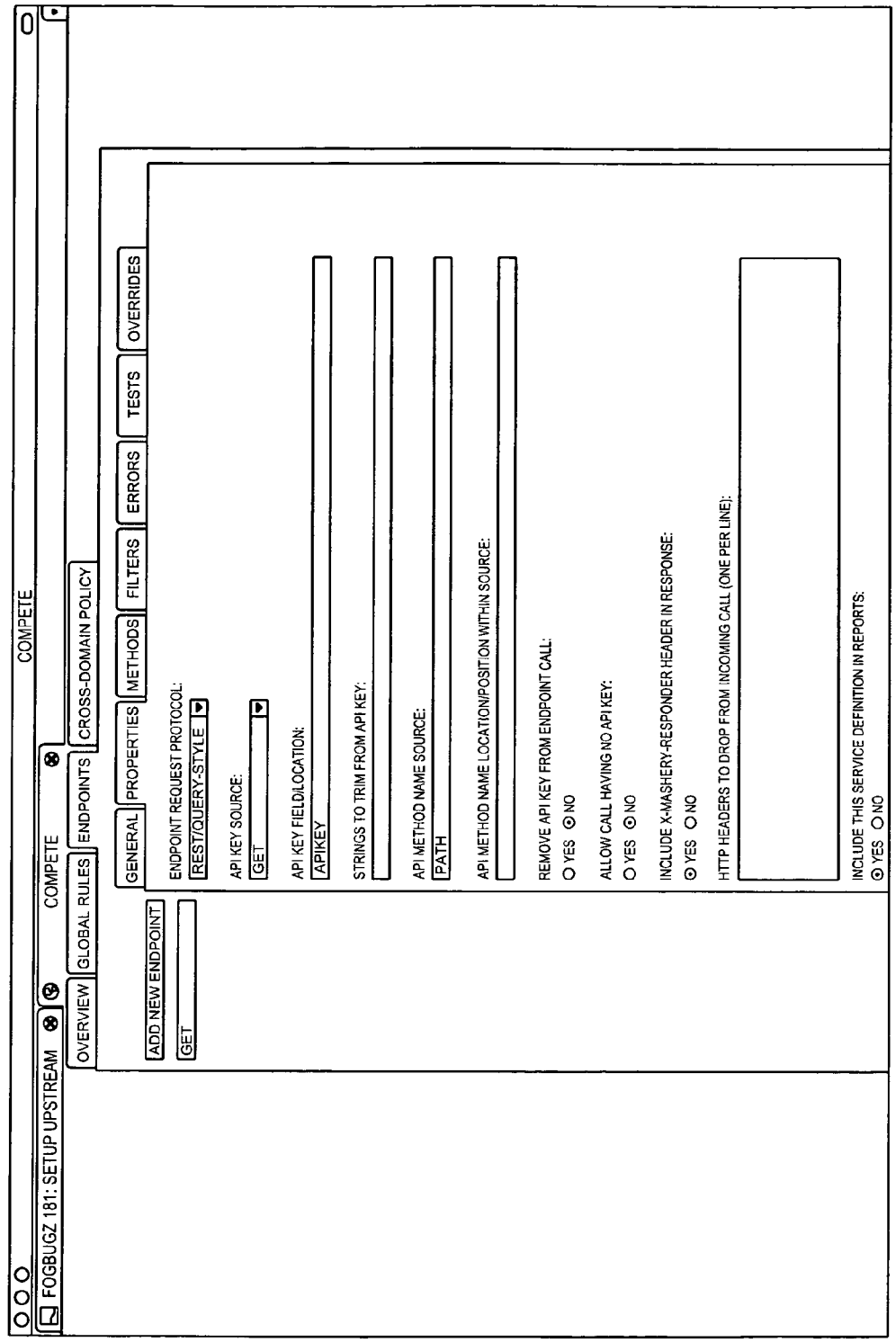
FIG. 19 shows a web page 1900 displaying various endpoints properties and inputs according to an illustrative embodiment of the invention.

FIG. 19 shows a web page 1900 displaying various endpoints properties and inputs according to an illustrative embodiment of the invention.

Figure 20:
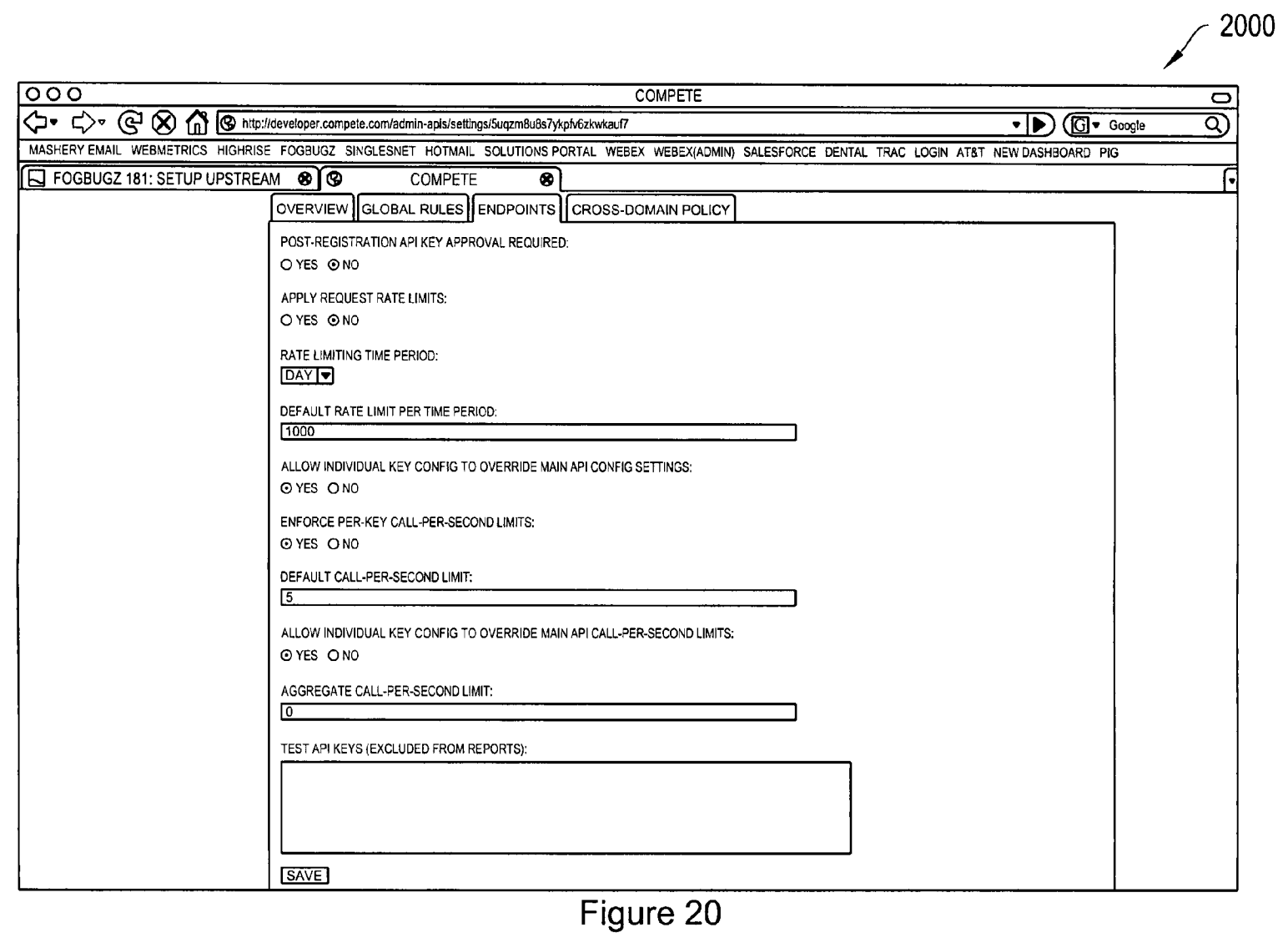

FIG. 20 shows a web page 2000 displaying various global rules according to an illustrative embodiment of the invention.

Figure 21:
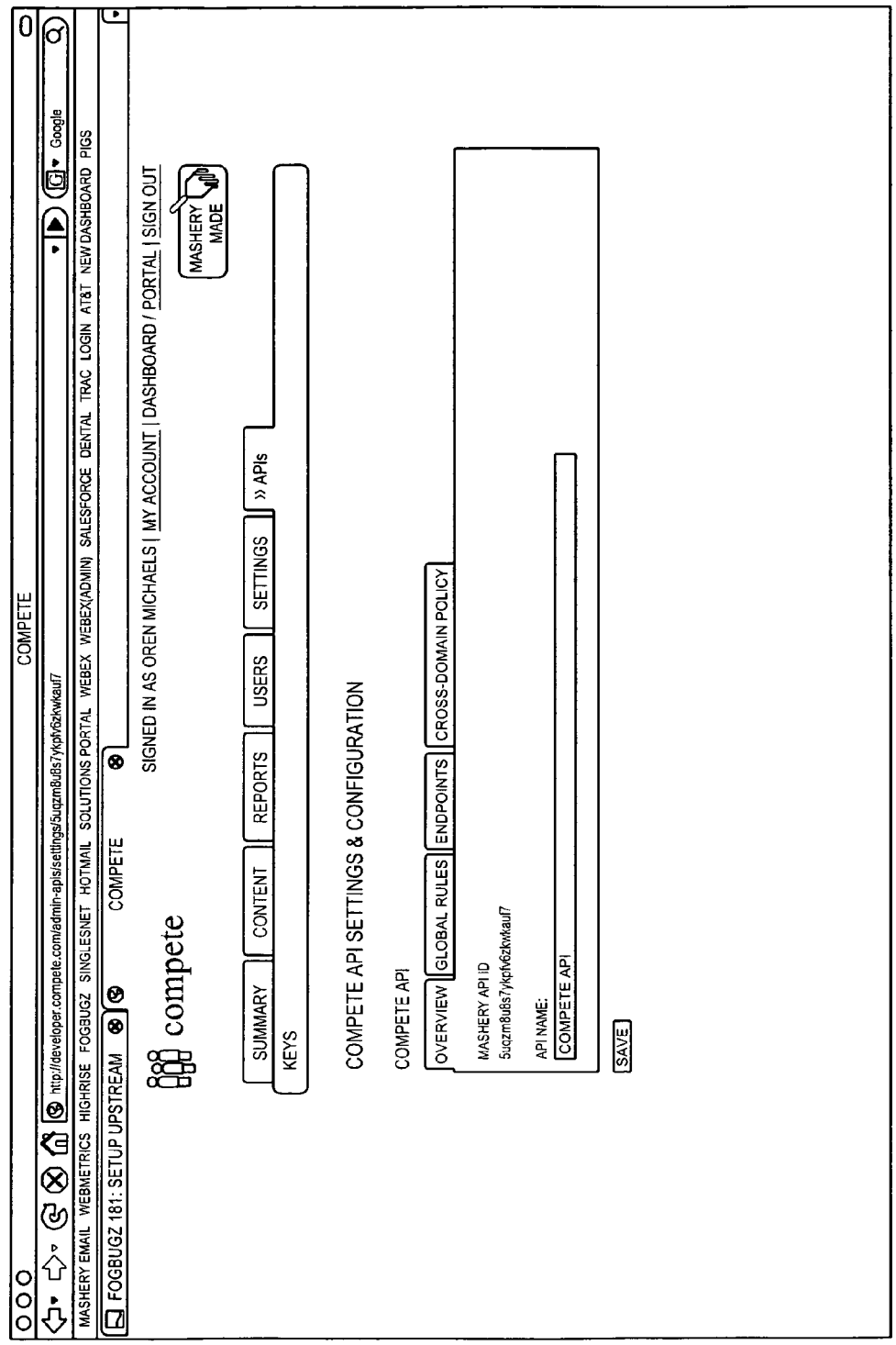
FIG. 21 shows a web page 2100 displaying an API overview according to an illustrative embodiment of the invention.

FIG. 21 shows a web page 2100 displaying an API overview according to an illustrative embodiment of the invention.

In certain embodiments, the proxy server 104 perform pre- and/or post-processing of requests and responses, and can also perform traffic shaping and load balancing services. This can take several forms, such as, without limitation:

Translate a REST API query that comes from a third-party developer into SOAP in order to take advantage of the proxy server 104 customer's existing SOAP-based API.

Translate a SOAP or XML response into JSON, or vice versa.

Reformat an incoming "standard format" API request into the proxy server 104 customer's proprietary format needed to take advantage of an existing internal services-based architecture, and translate the proprietary response into a standard format.

Distribute incoming calls to the proxy server 104 among several client API servers, in order to balance load or fail over from API servers which are slow or non-responsive.

Based on the API key, geography, API method, or other information in the call, the proxy server 104 may direct the call to different API servers. For instance, some keys may have access to an alpha version of a new API, while the rest of the keys should be directed to the production API. Or some percentage of calls can be directed to the new version, for testing purposes, while the balance of calls go to production.

Based on the business rules in existence for each key, some calls can take priority during times of high volume. For instance, a "gold partner" who has a preferential status will have their calls routed by the proxy server 104 during high volume times, while a "free API user" may have some or all of their calls rejected when/if volume overwhelms the available resources.

It will be apparent to those of ordinary skill in the art that methods involved in the present invention may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon. A program may include a complete software application, a portion of an application, a portion of software code or coding, one or more lines of script or code, or source code, or executable code.

What is claimed is:

1. An application program interface (API) management server comprising:
   an API source interface to i) send a request for one or more API elements to an API source, and ii) receive the one or more API elements from the API source,
   a processor to i) determine whether to allow a request from a client application for the one or more API elements based on a distribution rule set, wherein the distribution rule set includes a rule associated with a limit on a number of API calls, and ii) monitor distribution of the one or more API elements including monitoring of at least one of the number of API requests made by the client application over a period of time, usage trends by the client application, and usage trends based on Internet Protocol (IP) address;
   an interface to i) receive the request for the one or more API elements from the client application and ii) send the one or more API elements to the client application in response to a determination by the processor to allow the request; and
   a monitor interface to produce and display a web page that is capable of displaying (i) API access information of the API elements and (ii) an error code message, wherein the API access information includes API usage trend information, API usage plots, API access and usage amounts over a period of time, average API calls per developer, or average API calls per IP address, and wherein the error code message is specified by an API owner or provider.

2. The server of claim 1, wherein the processor is to monitor the identity of the client application.

3. The server of claim 1, wherein the monitor interface is further to send API distribution information to a user interface, wherein the user interface is remote from the management server.

4. The server of claim 3, wherein the user interface includes a web browser.

5. The server of claim 1, wherein the API source interface and the interface are included in a network interface unit or in different network interface units.

6. The server of claim 1, wherein to determine whether to allow the request includes to determine whether the client application is authorized to access the one or more API elements and, if authorized, to allow the interface to send the one or more API elements to the client application or, if not authorized, to prevent the interface from sending the one or more API elements to the client application.

7. The server of claim 6, wherein to determine whether the client application is authorized includes to validate a key associated with the request from the client application.

8. The server of claim 1, wherein the client application includes a network-based application operating at run-time and the one or more API elements are run-time API elements.

9. The server of claim 1, wherein the request for the one or more API elements from the client application is substantially the same as the request for the one or more API elements to the API source.

10. A method for controlling web-based application access to one or more application programmer interface (API) elements comprising:
    receiving, at an intermediate server, a request for the one or more API elements from a client application,
    sending a request to an API source for one or more API elements,
    receiving, at the intermediate server, the one or more API elements from the API source,
    determining, at the intermediate server, whether to allow the request from the client application for the one or more API elements based on a distribution rule set wherein the distribution rule set includes a rule associated with a limit on a number of API calls,
    monitoring, at the intermediate server, the distribution of the one or more API elements including monitoring at least one of the number of API requests made by the client application over a period of time, usage trends by the client application, and usage trends based on Internet Protocol (IP) address,
    sending the one or more API elements to the client application in response to determining to allow the request; and
    producing and displaying a web page that is capable of displaying (i) API access information of the API elements and (ii) an error code message, wherein the API access information includes API usage trend information, API usage plots, API access and usage amounts over a period of time, average API calls per developer, or average API calls per IP address, and wherein the error code message is specified by an API owner or provider.

11. The method of claim 10, wherein the monitoring includes monitoring the identity of the client application.

12. The method of claim 10 comprising sending API distribution information to a user interface, the user interface being remote from the intermediate server.

13. The method of claim 12, wherein the user interface includes a web browser.

14. The method of claim 10, wherein the sending and receiving are performed by a network interface unit or by different network interface units.

15. The method of claim 10, wherein determining whether to allow the request includes determining whether the client application is authorized to access the one or more API elements and, if authorized, allowing the sending of the one or more API elements to the client application or, if not authorized, preventing the sending of the one or more API elements to the client application.

16. The method of claim 15, wherein determining whether the client application is authorized includes validating a key associated with the request from the client application.

17. The method of claim 10, wherein the client application includes a network-based application operating at run-time and the one or more API elements are run-time API elements.

18. The method of claim 10, wherein the request for the one or more API elements from the client application is substantially the same as the request for the one or more API elements to the API source.

19. An intermediate server for controlling the exchange of data in a network comprising:
a transceiver,
a processor in communication with the transceiver, and
a computer readable medium configured for enabling the processor to i) receive a request for one or more application program interface (API) elements from a client application, ii) send a request to an API source for the one or more API elements, iii) receive the one or more API elements from the API source, iv) determine whether to allow the request from the client application for the one or more API elements based on a distribution rule set, wherein the distribution rule set includes a rule associated with a limit on a number of API calls, v) monitor distribution of the one or more API elements including monitoring at least one of the number of API requests made by the client application over a period of time, usage trends by the client application, and usage trends based on Internet Protocol (IP) address, vi) send the one or more API elements to the client application in response to a determination to allow the request based on the distribution rule set; and vii) produce and display a web page that is capable of displaying (a) API access information of the API elements and (b) an error code message, wherein the API access information includes API usage trend information, API usage plots, API access and usage amounts over a period of time, average API calls per developer, or average API calls per IP address, and wherein the error code message is specified by an API owner or provider.

20. The server of claim 19, wherein to determine whether to allow the request includes to determine whether the client application is authorized to access the one or more API elements and, if authorized, to allow the sending of the one or more API elements to the client application or, if not authorized, to prevent the sending of the one or more API elements to the client application.

21. The server of claim 20, wherein to determine whether the client application is authorized includes to validate a key associated with the request from the client application.

22. The server of claim 19, wherein the client application includes an application operating at run-time and the one or more API elements are run-time API elements.

23. The server of claim 19, wherein the request for the one or more API elements from the client application is substantially the same as the request for the one or more API elements to the API source.

24. The server of claim 19, wherein the distribution rule set includes rules associated with at least one of a limit on the number of API calls over a select period of time, a limit of API calls for the client application, and a limit of API calls for a select Internet Protocol (IP) address.

* * * * *